(12) United States Patent
Liu et al.

(10) Patent No.: US 12,169,582 B2
(45) Date of Patent: Dec. 17, 2024

(54) PRIVACY PROTECTION-BASED MULTICOLLINEARITY DETECTION METHODS, APPARATUSES, AND SYSTEMS

(71) Applicants: ALIPAY (HANGZHOU) INFORMATION TECHNOLOGY CO., LTD., Zhejiang (CN); ANT BLOCKCHAIN TECHNOLOGY (SHANGHAI) CO., LTD., Shanghai (CN)

(72) Inventors: Yingting Liu, Hangzhou (CN); Chaochao Chen, Hangzhou (CN); Jun Zhou, Hangzhou (CN); Li Wang, Hangzhou (CN)

(73) Assignees: Alipay (Hangzhou) Information Technology Co., Ltd., Hangzhou (CN); Ant Blockchain Technology (Shanghai) Co., Ltd., Shanghai (CN)

( * ) Notice: Subject to any disclaimer, the term of this patent is extended or adjusted under 35 U.S.C. 154(b) by 374 days.

(21) Appl. No.: 17/586,028

(22) Filed: Jan. 27, 2022

(65) Prior Publication Data

US 2022/0237319 A1    Jul. 28, 2022

(30) Foreign Application Priority Data

Jan. 28, 2021   (CN) .......................... 202110115832.8

(51) Int. Cl.
*G06F 21/62* (2013.01)
*H04L 9/08* (2006.01)

(52) U.S. Cl.
CPC .......... *G06F 21/6245* (2013.01); *H04L 9/085* (2013.01); *H04L 2209/46* (2013.01)

(58) Field of Classification Search
CPC . G06F 21/6245; G06F 21/6254; H04L 9/085; H04L 2209/46; G06N 20/00
See application file for complete search history.

(56) References Cited

U.S. PATENT DOCUMENTS 7,664,713 B1 * 2/2010 Haffner .................. G06N 20/10
                                                    706/12
8,185,490 B1 * 5/2012 Baggenstoss ........... G10L 25/27
                                                    706/12

(Continued)

FOREIGN PATENT DOCUMENTS

| CN | 111062487 | 4/2020 |
| CN | 111931241 | 11/2020 |

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Aravind K Moorthy
(74) *Attorney, Agent, or Firm* — Fish & Richardson P.C.

(57) ABSTRACT

One or more embodiments of the present specification provide privacy protection-based multicollinearity detection methods, apparatuses, and systems. Data alignment is performed by a member device on respective local feature data with other member devices to construct a joint feature matrix. Privacy protection-based multi-party matrix multiplication computation is performed to compute a product matrix of a transposed matrix of the joint feature matrix and the joint feature matrix. An inverse matrix of the product matrix is determined based on respective submatrices of the product matrix. A variance inflation factor of each attribute feature is determined by the member device with the other member devices using respective submatrices of the inverse matrix and the respective local feature data. Multicollinearity is determined by the member device with the other member devices based on fragment data of the variance inflation factor of each attribute feature.

20 Claims, 10 Drawing Sheets

(56) References Cited

U.S. PATENT DOCUMENTS

| | | | |
|---|---|---|---|
| 10,296,832 B1* | 5/2019 | Segev | G06F 16/283 |
| 10,410,140 B1* | 9/2019 | Nair | G06N 5/02 |
| 10,460,320 B1* | 10/2019 | Cao | G06N 20/10 |
| 10,635,739 B1* | 4/2020 | Batruni | G06N 20/00 |
| 10,726,359 B1* | 7/2020 | Drouin | G16H 50/30 |
| 10,872,038 B1* | 12/2020 | Nair | G06N 3/063 |
| 10,891,136 B1* | 1/2021 | Sodani | G06F 9/3877 |
| 11,176,483 B1* | 11/2021 | Sundararaman | G06F 16/2282 |
| 11,373,117 B1* | 6/2022 | Cui | G06F 16/285 |
| 11,444,926 B1* | 9/2022 | Gama | G06N 5/04 |
| 11,455,442 B1* | 9/2022 | Daloukas | G06F 30/20 |
| 11,580,191 B1* | 2/2023 | Gural | G06F 17/16 |
| 11,836,102 B1* | 12/2023 | Mathuriya | G06N 20/00 |
| 11,922,329 B2* | 3/2024 | Achin | G06Q 10/04 |
| 2007/0211064 A1* | 9/2007 | Buck | G06N 20/00 345/519 |
| 2008/0016433 A1* | 1/2008 | Stolpman | H03M 13/6544 714/786 |
| 2008/0140751 A1* | 6/2008 | Ide | G06F 18/00 708/520 |
| 2009/0282039 A1* | 11/2009 | Diamond | H04L 9/3066 |
| 2010/0054457 A1* | 3/2010 | Schneider | H04L 9/085 380/28 |
| 2010/0054470 A1* | 3/2010 | Schneider | H04L 9/085 380/255 |
| 2013/0268467 A1* | 10/2013 | Yoon | G06N 20/00 706/12 |
| 2015/0088953 A1* | 3/2015 | Koduvely | G06F 18/2136 708/520 |
| 2015/0170020 A1* | 6/2015 | Garimella | G06N 3/082 706/14 |
| 2015/0248630 A1* | 9/2015 | Ramanan | G06Q 30/02 705/7.25 |
| 2015/0269744 A1* | 9/2015 | Mukherjee | G06V 40/23 382/103 |
| 2015/0339572 A1* | 11/2015 | Achin | G06N 20/00 706/46 |
| 2015/0378962 A1* | 12/2015 | Golovashkin | G06F 18/24 708/607 |
| 2016/0034810 A1* | 2/2016 | Hershey | G06N 3/084 706/22 |
| 2017/0032487 A1* | 2/2017 | Ashari | G06T 1/20 |
| 2017/0202046 A1* | 7/2017 | Lee | H04W 4/08 |
| 2017/0220954 A1* | 8/2017 | Suryakantha | G06Q 30/0201 |
| 2017/0262900 A1* | 9/2017 | Ramachandran | G06N 20/00 |
| 2017/0344829 A1* | 11/2017 | Lan | G06V 40/103 |
| 2017/0372232 A1* | 12/2017 | Maughan | G06F 3/0482 |
| 2018/0039480 A1* | 2/2018 | Komagata | G06F 7/483 |
| 2018/0144242 A1* | 5/2018 | Simard | G06N 3/045 |
| 2018/0241548 A1 | 8/2018 | Dolev et al. | |
| 2018/0337899 A1* | 11/2018 | Becker | H04L 9/0825 |
| 2019/0036971 A1* | 1/2019 | Ford | G06F 11/3438 |
| 2019/0080241 A1* | 3/2019 | Guo | G06N 3/084 |
| 2019/0087689 A1* | 3/2019 | Chen | H04L 9/0825 |
| 2019/0089687 A1* | 3/2019 | Fiske | H04L 9/304 |
| 2019/0104121 A1* | 4/2019 | Khandani | H04L 9/0891 |
| 2019/0171823 A1* | 6/2019 | Maluf | G06F 21/577 |
| 2019/0179869 A1* | 6/2019 | Park | G06F 12/0802 |
| 2019/0180358 A1* | 6/2019 | Nandan | G06F 18/2113 |
| 2019/0221317 A1* | 7/2019 | Kempanna | G10L 25/54 |
| 2019/0228344 A1* | 7/2019 | Hong | G06F 8/443 |
| 2019/0354894 A1* | 11/2019 | Lazovich | G06E 1/00 |
| 2019/0370854 A1* | 12/2019 | Gao | H04W 4/21 |
| 2019/0372867 A1* | 12/2019 | Palamari | G06F 9/45558 |
| 2020/0019891 A1* | 1/2020 | Poirel | H04L 63/1433 |
| 2020/0065351 A1* | 2/2020 | Chao | G06N 3/044 |
| 2020/0104849 A1* | 4/2020 | Cai | G06Q 40/00 |
| 2020/0128036 A1* | 4/2020 | Sarzynski | G06F 21/6254 |
| 2020/0143448 A1* | 5/2020 | Steck | G06N 3/08 |
| 2020/0152179 A1* | 5/2020 | van Hout | G10L 15/22 |
| 2020/0218946 A1* | 7/2020 | Dell'Anna | G06F 17/16 |
| 2020/0293861 A1* | 9/2020 | Marukame | G06N 3/088 |
| 2020/0349575 A1* | 11/2020 | Karmakar | G06F 17/15 |
| 2020/0372355 A1* | 11/2020 | Tarlow | G06N 3/08 |
| 2021/0014221 A1* | 1/2021 | Kukreja | H04L 63/108 |
| 2021/0049229 A1* | 2/2021 | Nair | G06F 17/153 |
| 2021/0058229 A1* | 2/2021 | Jiang | G06F 21/6245 |
| 2021/0150197 A1* | 5/2021 | Kokkinos | G06V 10/74 |
| 2021/0152348 A1* | 5/2021 | Shim | H04L 9/30 |
| 2021/0182332 A1* | 6/2021 | Donaldson | G06F 21/6245 |
| 2021/0287111 A1* | 9/2021 | Zhou | G06Q 10/10 |
| 2021/0287235 A1* | 9/2021 | Dhawan | G06N 20/00 |
| 2021/0287273 A1* | 9/2021 | Janakiraman | G06Q 30/0623 |
| 2021/0326750 A1* | 10/2021 | Shah | G06N 20/00 |
| 2021/0343058 A1* | 11/2021 | Yang | G06N 3/045 |
| 2021/0365923 A1* | 11/2021 | Lange | G06F 11/3006 |
| 2021/0383199 A1* | 12/2021 | Weissenborn | G06N 3/045 |
| 2022/0027784 A1* | 1/2022 | Yuan | G06N 3/088 |
| 2022/0035353 A1* | 2/2022 | Andreu | G06F 17/13 |
| 2022/0044179 A1* | 2/2022 | Tiwari | G06F 16/288 |
| 2022/0051043 A1* | 2/2022 | Lee | G06N 3/08 |
| 2022/0067296 A1* | 3/2022 | Singh Bawa | G06N 3/08 |
| 2022/0067529 A1* | 3/2022 | Wagner | G06N 3/084 |
| 2022/0067533 A1* | 3/2022 | Jiao | G06N 3/063 |
| 2022/0147540 A1* | 5/2022 | Rossi | G06F 3/0482 |
| 2022/0164380 A1* | 5/2022 | Lin | G06F 16/532 |
| 2022/0207411 A1* | 6/2022 | Kazakov | G06T 1/20 |
| 2022/0229721 A1* | 7/2022 | Rossi | G06F 17/16 |

OTHER PUBLICATIONS

Nakamoto, "Bitcoin: A Peer-to-Peer Electronic Cash System," www.bitcoin.org, 2005, 9 pages.

* cited by examiner

PRIVACY PROTECTION-BASED MULTICOLLINEARITY DETECTION METHODS, APPARATUSES, AND SYSTEMS

CROSS-REFERENCE TO RELATED APPLICATIONS

This application claims priority to Chinese Patent Application No. 202110115832.8, filed on Jan. 28, 2021, which is hereby incorporated by reference in its entirety.

TECHNICAL FIELD

Embodiments of this specification usually relate to the field of artificial intelligence, and in particular, to privacy protection-based multicollinearity detection methods, apparatuses, and systems.

BACKGROUND

Machine learning technology is widely applied to various service application scenarios. In some service application scenarios, a machine learning model is used as a service model to implement various service prediction services such as classification prediction and service risk prediction. Before the service model is applied to the service prediction services, a service model needs to be constructed by using modeling data. The modeling data may be, for example, service data collected by a data provider for service model modeling. The modeling data usually has multidimensional features (which may also be referred to as multidimensional variables). The multidimensional features of the modeling data are used as model features or predictive features of the constructed service model.

When the service model is a regression model, some predictive features may be correlated with other predictive features in a process of constructing the service model. In other words, there is multicollinearity between the predictive features of the service model. If there is severe multicollinearity between the predictive features of the service model, a variance of a regression coefficient is increased, resulting in an unstable modeling result of the service model. In addition, the multicollinearity of the modeling data can greatly reduce the interpretability of the regression model. For example, when there is severe multicollinearity between the predictive features of the service model, different parameter estimates (relatively large parameter variance) are obtained during a plurality of times of modeling, and the regression coefficient may not be significant even if there is a significant relationship between the predictive features and a label. Furthermore, regression coefficients of highly correlated predictive features vary greatly between samples, and even include wrong symbols. The interpretability of the regression model is an important consideration in service model modeling, especially in service model modeling in the financial field.

In addition, during service model modeling, to improve the modeling accuracy of the service model, a multi-platform joint modeling solution is used. That is, the service model is jointly constructed by using modeling data provided by a plurality of modeling participants. The modeling data provided by the plurality of modeling participants are generated in similar application scenarios, which inevitably results in modeling features that are named differently but are actually collinear. Consequently, there is a high possibility that there is multicollinearity between the predictive features of the service model. Furthermore, the modeling data provided by the plurality of modeling participants is private data, and privacy security of modeling data of each modeling participant needs to be ensured during multi-party joint modeling. Therefore, before the regression model is constructed, privacy protection-based multicollinearity detection needs to be performed on the modeling data provided by the plurality of modeling participants.

SUMMARY

In view of the previously described content, embodiments of this specification provide privacy protection-based multicollinearity detection methods, apparatuses, and systems, to implement multicollinearity detection while privacy security of local feature data of each member device is ensured.

According to an aspect of the embodiments of this specification, a privacy protection-based multicollinearity detection method is provided. The method is performed by one of at least two member devices, and each of the at least two member devices holds local feature data. The method includes: performing data alignment on respective local feature data with the other member devices, to construct a joint feature matrix; performing privacy protection-based multi-party matrix multiplication computation with the other member devices, to compute a product matrix of a transposed matrix of the joint feature matrix and the joint feature matrix, where each member device holds a submatrix of the product matrix; determining an inverse matrix of the product matrix with the other member devices based on respective submatrices of the product matrix, where each member device holds a submatrix of the inverse matrix; determining a variance inflation factor of each attribute feature with the other member devices by using respective submatrices of the inverse matrix and the respective local feature data, where each member device holds fragment data of the variance inflation factor of each attribute feature; and determining multicollinearity with the other member devices based on respectively held fragment data of the variance inflation factor of each attribute feature.

Optionally, in an example of the previous aspect, the determining an inverse matrix of the product matrix with the other member devices based on respective submatrices of the product matrix, where each member device holds a submatrix of the inverse matrix includes: determining the inverse matrix of the product matrix with the other member devices by using a Newton's method and based on the respective submatrices of the product matrix, where each member device holds the submatrix of the inverse matrix, and in each Newton's iteration process, a matrix product of the submatrices of the product matrix of the member devices is implemented based on secret sharing matrix computation.

Optionally, in an example of the previous aspect, the local feature data of each member device includes local feature data based on horizontal data sharding or local feature data based on vertical data sharding.

Optionally, in an example of the previous aspect, when the local feature data of each member device includes local feature data based on vertical data sharding, the determining a variance inflation factor of each attribute feature with the other member devices by using respective submatrices of the inverse matrix and the respective local feature data includes: determining, by using the local feature data, a feature variance that is of each attribute feature and held by the member device; and determining the variance inflation factor $VIF_i$ of each attribute feature i with the other member devices based on an equation $VIF_i = (X^T X)_{ii}^{-1} (n-1) Var(X_i)$ and by using the respective submatrices of the inverse matrix and respectively held feature variances of the attribute feature, where each member device holds the fragment data of the variance inflation factor $VIF_i$ of each attribute feature i, X is the joint feature matrix, $X^T$ is the transposed matrix of the joint feature matrix, $(X^TX)_{ii}^{-1}$ represents the ith element on the diagonal of the inverse matrix $(X^TX)^{-1}$, $Var(X_i)$ is the feature variance of the attribute feature i, n is a total quantity of pieces of sample data, a product of $(X^TX)_{ii}^{-1}$ and $Var(X_i)$ is obtained by performing secret sharing multiplication by the member devices by using corresponding fragment elements in the respective submatrices of the inverse matrix and the respectively held feature variances, and feature variances of the attribute feature that are held by the other member devices are determined by the member device based on the local feature data.

Optionally, in an example of the previous aspect, when the local feature data of each member device includes local feature data based on horizontal data sharding, the determining a variance inflation factor of each attribute feature with the other member devices by using respective submatrices of the inverse matrix and the respective local feature data includes: determining a feature variance fragment of a feature variance $Var(X_i)$ of each attribute feature i at the member device by using the local feature data; and determining the variance inflation factor $VIF_i$ of each attribute feature i with the other member devices based on an equation $VIF_i=(X^TX)_{ii}^{-1}(n-1)Var(X_i)$ and by using the respective submatrices of the inverse matrix and the feature variance fragment of each attribute feature i, where each member device holds the fragment data of the variance inflation factor $VIF_i$ of each attribute feature i, X is the joint feature matrix, $X^T$ is the transposed matrix of the joint feature matrix, $(X^TX)_{ii}^{-1}$ represents the ith element on the diagonal of the inverse matrix $(X^TX)^{-1}$, n is a total quantity of pieces of sample data, a product of $(X^TX)_{ii}^{-1}$ and $Var(X_i)$ is obtained by performing secret sharing multiplication by the member devices by using corresponding fragment elements in the respective submatrices of the inverse matrix and respective feature variance fragments, and feature variance fragments of the other member devices are determined by using respective local feature data.

Optionally, in an example of the previous aspect, the privacy protection-based multi-party matrix multiplication computation includes one of the following multi-party matrix multiplication: multi-party block matrix multiplication or multi-party secret sharing transposed matrix multiplication.

Optionally, in an example of the previous aspect, the performing data alignment on respective local feature data with the other member devices, to construct a joint feature matrix may include: performing data alignment on the respective local feature data with the other member devices by using a private set intersection protocol, to construct the joint feature matrix.

Optionally, in an example of the previous aspect, the determining multicollinearity with the other member devices based on respectively held fragment data of the variance inflation factor of each attribute feature may include: reconstructing the variance inflation factor of each attribute feature with the other member devices based on the respectively held fragment data of the variance inflation factor of each attribute feature; and when the reconstructed variance inflation factor of the attribute feature is less than a first reference value, it is determined that there is no multicollinearity for the attribute feature; or when the reconstructed variance inflation factor of the attribute feature is not less than a first reference value and less than a second reference value, it is determined that there is level-1 multicollinearity for the attribute feature; or when the reconstructed variance inflation factor of the attribute feature is not less than a second reference value, it is determined that there is level-2 multicollinearity for the attribute feature.

Optionally, in an example of the previous aspect, the local feature data of each member device is modeling data of a regression model, and the method may further include: when it is determined that there is the level-2 multicollinearity for the attribute feature, removing the attribute feature from a modeling feature of the regression model or combining the attribute feature and other related modeling features of the regression model into a single modeling feature.

According to another aspect of the embodiments of this specification, a privacy protection-based multicollinearity detection apparatus is provided. The multicollinearity detection apparatus is applied to one of at least two member devices, and each of the at least two member devices holds local feature data. The multicollinearity detection apparatus includes at least one processor, a storage coupled to the at least one processor, and a computer program stored in the storage. The at least one processor executes the computer program, to implement the following operations: performing data alignment on respective local feature data with the other member devices, to construct a joint feature matrix; performing privacy protection-based multi-party matrix multiplication computation with the other member devices, to compute a product matrix of a transposed matrix of the joint feature matrix and the joint feature matrix, where each member device holds a submatrix of the product matrix; determining an inverse matrix of the product matrix with the other member devices based on respective submatrices of the product matrix, where each member device holds a submatrix of the inverse matrix; determining a variance inflation factor of each attribute feature with the other member devices by using respective submatrices of the inverse matrix and the respective local feature data, where each member device holds fragment data of the variance inflation factor of each attribute feature; and determining multicollinearity with the other member devices based on respectively held fragment data of the variance inflation factor of each attribute feature.

Optionally, in an example of the previous aspect, the at least one processor executes the computer program, to implement the following operation: determining the inverse matrix of the product matrix with the other member devices by using a Newton's method and based on the respective submatrices of the product matrix, where each member device holds the submatrix of the inverse matrix, and in each Newton's iteration process, a matrix product of the submatrices of the product matrix of the member devices is implemented based on secret sharing matrix computation.

Optionally, in an example of the previous aspect, when the local feature data of each member device includes local feature data based on vertical data sharding, the at least one processor executes the computer program, to implement the following operations: determining, by using the local feature data, a feature variance that is of each attribute feature and held by the member device; and determining the variance inflation factor $VIF_i$ of each attribute feature i with the other member devices based on an equation $VIF_i=(X^TX)_{ii}^{-1}(n-1)Var(X_i)$ and by using the respective submatrices of the inverse matrix and respectively held feature variances of the attribute feature, where each member device holds the fragment data of the variance inflation factor $VIF_i$ of each attribute feature i, X is the joint feature matrix, $X^T$ is the transposed matrix of the joint feature matrix, $(X^TX)_{ii}^{-1}$ represents the ith element on the diagonal of the inverse matrix $(X^TX)^{-1}$, $Var(X_i)$ is the feature variance of the attribute feature i, n is a total quantity of pieces of sample data, a product of $(X^TX)_{ii}^{-1}$ and $Var(X_i)$ is obtained by performing secret sharing multiplication by the member devices by using corresponding fragment elements in the respective submatrices of the inverse matrix and the respectively held feature variances, and feature variances of the attribute feature that are held by the other member devices are determined by the member device based on the local feature data.

Optionally, in an example of the previous aspect, when the local feature data of each member device includes local feature data based on horizontal data sharding, the at least one processor executes the computer program, to implement the following operations: determining a feature variance fragment of a feature variance $Var(X_i)$ of each attribute feature i at the member device by using the local feature data; and determining the variance inflation factor $VIF_i$ of each attribute feature i with the other member devices based on an equation $VIF_i=(X^TX)_{ii}^{-1}(n-1)Var(X_i)$ and by using the respective submatrices of the inverse matrix and the feature variance fragment of each attribute feature i, where each member device holds the fragment data of the variance inflation factor $VIF_i$ of each attribute feature i, X is the joint feature matrix, $X^T$ is the transposed matrix of the joint feature matrix, $(X^TX)_{ii}^{-1}$ represents the ith element on the diagonal of the inverse matrix $(X^TX)^{-1}$, n is a total quantity of pieces of sample data, a product of $(X^TX)_{ii}^{-1}$ and $Var(X_i)$ is obtained by performing secret sharing multiplication by the member devices by using corresponding fragment elements in the respective submatrices of the inverse matrix and respective feature variance fragments, and feature variance fragments of the other member devices are determined by using respective local feature data.

Optionally, in an example of the previous aspect, the at least one processor executes the computer program, to implement the following operation: performing data alignment on the respective local feature data with the other member devices by using a private set intersection protocol, to construct the joint feature matrix.

Optionally, in an example of the previous aspect, the at least one processor executes the computer program, to further implement the following operations: reconstructing the variance inflation factor of each attribute feature with the other member devices based on the respectively held fragment data of the variance inflation factor of each attribute feature; and when the reconstructed variance inflation factor of the attribute feature is less than a first reference value, it is determined that there is no multicollinearity for the attribute feature; or when the reconstructed variance inflation factor of the attribute feature is not less than a first reference value and less than a second reference value, it is determined that there is level-1 multicollinearity for the attribute feature; or when the reconstructed variance inflation factor of the attribute feature is not less than a second reference value, it is determined that there is level-2 multicollinearity for the attribute feature.

Optionally, in an example of the previous aspect, the local feature data of each member device is modeling data of a regression model, and the at least one processor executes the computer program, to further implement the following operation: when it is determined that there is the level-2 multicollinearity for the attribute feature, removing the attribute feature from a modeling feature of the regression model or combining the attribute feature and other related modeling features of the regression model into a single modeling feature.

According to another aspect of the embodiments of this specification, a privacy protection-based multicollinearity detection system is provided, and includes at least two member devices. Each member device holds local feature data, and includes the previously described multicollinearity detection apparatus.

According to another aspect of the embodiments of this specification, a computer-readable storage medium is provided. The computer-readable storage medium stores a computer program, and the computer program is executed by a processor to implement the previously described multicollinearity detection method.

According to another aspect of the embodiments of this specification, a computer program product is provided, and includes a computer program. The computer program is executed by a processor to implement the previously described multicollinearity detection method.

BRIEF DESCRIPTION OF DRAWINGS

The nature and advantages of the content of this specification can be further understood with reference to the following accompanying drawings. In the accompanying drawings, similar components or features may have the same reference numerals.

DESCRIPTION OF EMBODIMENTS

Figure 1:
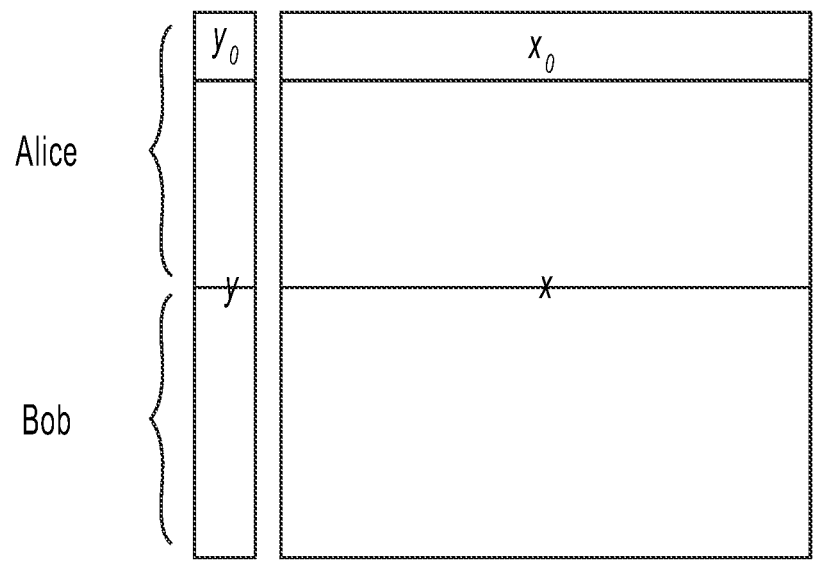
FIG. 1 is an example schematic diagram illustrating horizontal data sharding, according to embodiments of this specification.

The topics described in this specification are now described with reference to the example embodiments. It should be understood that the description of these embodiments is merely intended to enable a person skilled in the art to better understand and implement the topics described in this specification, and is not intended to limit the protection scope, applicability, or examples set forth in the claims. Functions and arrangements of the described elements can be changed without departing from the protection scope of the content of this specification. Examples can be omitted or replaced, or various processes or components can be added to various examples as needed. For example, the described methods can be performed in an order different from the described order, and steps can be added, omitted, or combined. In addition, features described with respect to some examples can be combined in other examples.

As used in this specification, the term "including" and variants thereof denote open terms, and mean "including but not limited to". The term "based on" means "at least partially based on". The terms "one embodiment" and "an embodiment" mean "at least one embodiment". The term "another embodiment" means "at least one other embodiment". The terms "first", "second", etc. can indicate different or same objects. Other definitions, whether explicit or implicit, can be included below. Unless explicitly indicated in the context, the definition of a term is consistent throughout the specification.

In this specification, the term "service model" refers to a machine learning model applied to a service scenario to implement a service prediction service, for example, a machine learning model used for classification prediction and service risk prediction. Examples of the machine learning model can include but are not limited to a linear regression model, a logistic regression model, a neural network model, a decision tree model, a support vector machine, etc. Examples of the neural network model can include but are not limited to a deep neural network (DNN) model, a convolutional neural network (CNN) model, a back propagation (BP) neural network, etc. In addition, the terms "attribute feature" and "modeling feature" can be used interchangeably in this specification.

A specific implementation form of the service model depends on a service scenario to which the service model is applied. For example, in an application scenario in which the service model is applied to classifying users, the service model is implemented as a user classification model. Correspondingly, user classification prediction can be performed on user feature data of a to-be-classified user based on the service model. In an application scenario in which the service model is applied to performing service risk prediction for a service transaction that occurs in a service system, the service model is implemented as a service risk prediction model. Correspondingly, service risk prediction can be performed for service transaction feature data of the service transaction based on the service model.

In an example of this specification, modeling data used in a service model modeling solution can be horizontally sharded data. The term "horizontal sharding" means that each modeling participant holds a part of modeling data of the service model, and each piece of sample data in the part of data held by each modeling participant is complete sample data, that is, includes all attribute feature data of the sample data and corresponding label values, but has a different sample ID.

FIG. 1 is an example schematic diagram illustrating horizontal data sharding, according to embodiments of this specification. Two modeling participants Alice and Bob are shown in FIG. 1. Cases are similar if there are a plurality of modeling participants. Each piece of sample data in a sample data set held by each of the modeling participants Alice and Bob is complete, in other words, each piece of sample data includes complete attribute feature data (x). For example, Alice holds a complete data sample ($x_0$, $y_0$), but the sample data held by the modeling participants Alice and Bob has different sample data IDs.

In another example of this specification, the modeling data used in the service model modeling solution can be vertically sharded data. The term "vertical sharding" means that each modeling participant holds a part of the modeling data of the service model, and each piece of sample data in the part of data held by each modeling participant is not complete sample data, but the sample data of each modeling participant has the same sample ID. That is, for each piece of sample data, data held by all the modeling participants constitutes the complete sample data. In an example, assume that there are two modeling participants Alice and Bob, and the modeling data includes a label $y_0$ and attribute feature data $x_A^0$ and $x_B^0$. After vertical sharding is performed, the modeling participant Alice holds $y_0$ and the attribute feature data $x_A^0$ in the modeling data, and the modeling participant Bob holds the attribute feature data $x_B^0$ in the modeling data. In another example, assume that the modeling data includes a label $y_0$ and attribute feature data $x_A^0$, $x_B^0$, and $x_C^0$. After vertical sharding is performed, the modeling participant Alice holds the label $y_0$ and the attribute feature data $x_A^0$ and $x_B^0$ in the modeling data, and the modeling participant Bob holds the attribute feature data $x_B^0$ and $x_C^0$ in the modeling data. In addition to these two examples, there are other possible situations, which are not listed one by one here.

Figure 2:
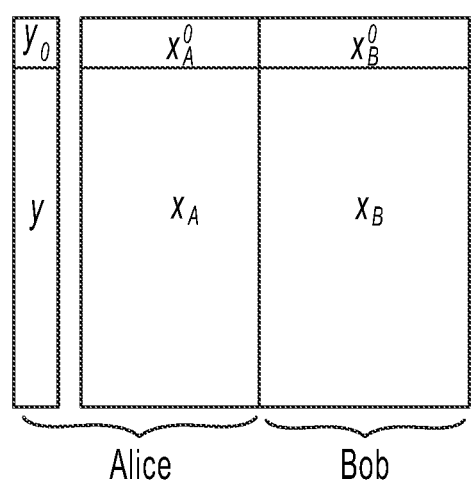
FIG. 2 is an example schematic diagram illustrating vertical data sharding, according to embodiments of this specification.

FIG. 2 is an example schematic diagram illustrating vertical data sharding, according to embodiments of this specification. Two modeling participants Alice and Bob are shown in FIG. 2. Cases are similar if there are a plurality of modeling participants. Each of the modeling participants Alice and Bob holds a part of each piece of sample data in modeling data of a service model. For each piece of sample data, the parts of data held by the modeling participants Alice and Bob can be combined to form complete content of the sample data. For example, assume that certain sample data includes a label $y_0$ and attribute feature data $x_A^0$ and $x_B^0$. After vertical sharding is performed, the modeling participant Alice holds the label $y_0$ and the attribute feature data $x_A^0$, and the modeling participant Bob holds the attribute feature data $x_B^0$.

With the development of artificial intelligence technologies, machine learning technology is widely applied to various service application scenarios by serving as a service model, to implement various service prediction services such as classification prediction and service risk prediction. For example, the service model is widely applied to fields such as financial deception, a recommendation system, and image recognition. To achieve better model performance, more modeling data is needed for service model modeling. In application fields such as medical treatment and finance, different enterprises or institutions hold different data samples. The modeling accuracy of the service model is greatly improved if the data is used for joint modeling, and therefore great economic benefits are brought to the enterprises.

However, modeling data provided by a plurality of modeling participants are generated in similar application scenarios, which inevitably results in features that are named differently but are actually collinear. Consequently, there is a high possibility that there is multicollinearity between the predictive features of the service model. If there is severe multicollinearity for the modeling data, a variance of a regression coefficient is increased, resulting in an unstable modeling result of the service model. In addition, the multicollinearity of the modeling data can greatly reduce the interpretability of the regression model.

In view of the previously described content, the embodiments of this specification provide a privacy protection-based multicollinearity detection solution. The multicollinearity detection solution is used to perform multicollinearity detection on local feature data (attribute feature data of sample data) held by a plurality of member devices. The multicollinearity detection solution is performed by the plurality of member devices, and each member device holds local feature data. The member devices perform data alignment on the respective local feature data, to construct a joint feature matrix, and collaboratively perform privacy protection-based multi-party matrix multiplication computation, to obtain a product matrix of a transposed matrix of the joint feature matrix and the joint feature matrix, where each member device holds a submatrix of the product matrix. The member devices then jointly determine an inverse matrix of the product matrix by using respective submatrices of the product matrix, where each member device holds a submatrix of the inverse matrix. Subsequently, the member devices determine a variance inflation factor of each attribute feature of sample data by using respective submatrices of the inverse matrix and the respective local feature data, where each member device holds fragment data of the variance inflation factor of each attribute feature, and determine multicollinearity based on fragment data of the variance inflation factor of each attribute feature.

In the multicollinearity detection solution, the member devices perform data alignment on the respective local feature data, to construct the joint feature matrix; collaboratively perform privacy protection-based multi-party secure computation, to obtain the product matrix of the joint feature matrix and the transposed matrix of the joint feature matrix and obtain the inverse matrix of the product matrix, where each member device holds the submatrix of the inverse matrix; and determine the variance inflation factor of each attribute feature by using the respective submatrices of the inverse matrix and the respective local feature data, to perform multicollinearity detection. As such, it can be ensured that private data of each member device is protected, the complexity of a process of determining the variance inflation factor can be reduced, and the detection accuracy and detection efficiency of multicollinearity detection can be improved.

Multicollinearity detection methods, multicollinearity detection apparatuses, and multicollinearity detection systems according to the embodiments of this specification are described in detail below with reference to the accompanying drawings. In the following description, description is provided by using two member devices as an example. However, the described implementation solutions can be extended to at least two member devices.

Figure 3:
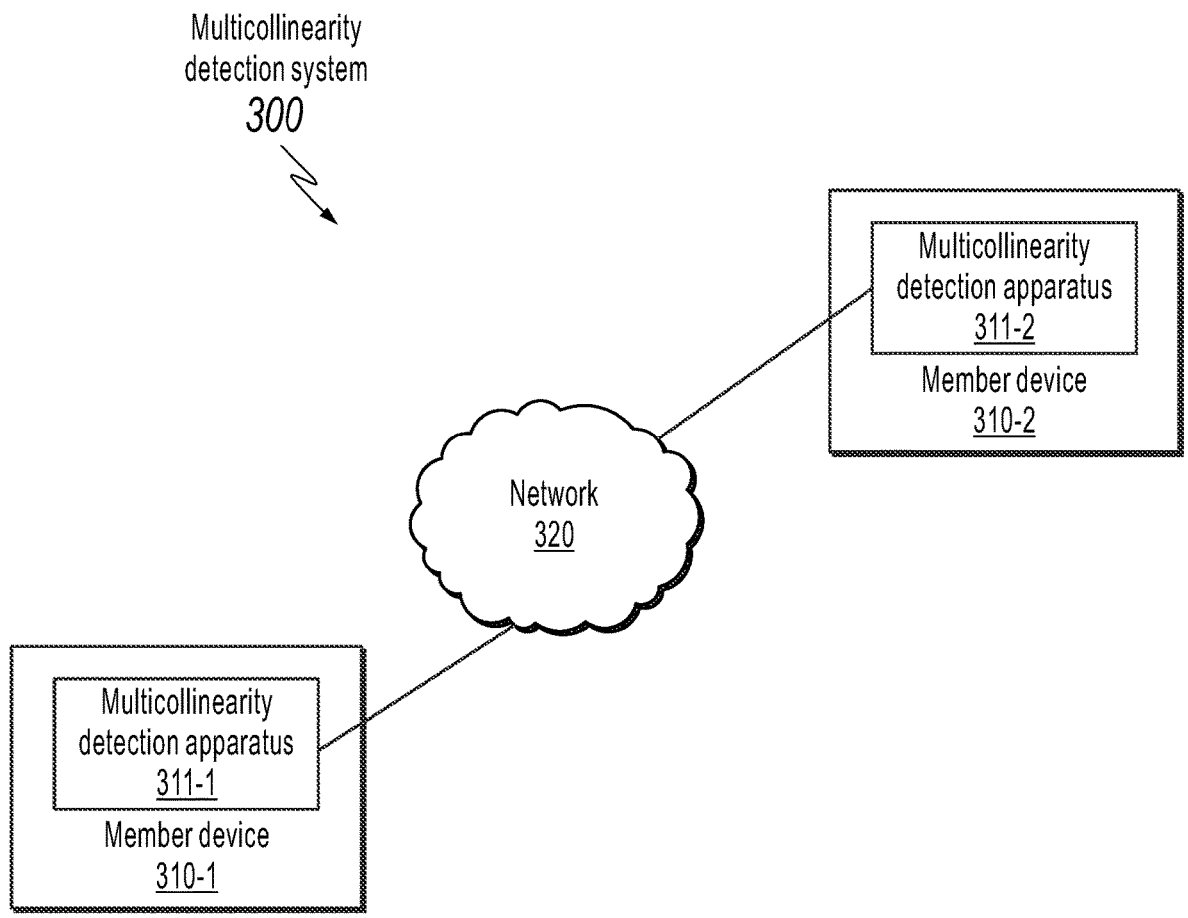
FIG. 3 is an example schematic diagram illustrating a multicollinearity detection system, according to embodiments of this specification.

FIG. 3 is a schematic diagram illustrating an architecture of a multicollinearity detection system 300, according to embodiments of this specification.

As shown in FIG. 3, the multicollinearity detection system 300 includes at least two member devices 310-1 and 310-2. Two member devices 310-1 and 310-2 are shown in FIG. 3. In other embodiments of this specification, there can be more member devices. The at least two member devices 310-1 and 310-2 can communicate with each other through a network 320 such as the Internet or a local area network. However, the network 320 is not limited to the Internet or the local area network.

In the embodiments of this specification, the member devices 310-1 and 310-2 can be devices or device parties configured to locally collect data samples, for example, intelligent terminal devices or server devices. In this specification, the term "member device" and the term "data holder" or "modeling party" can be used interchangeably.

In this specification, local data of the member devices 310-1 to 310-2 can include service data locally collected by the member devices. The service data can include feature data of a service object. Examples of the service object can include but are not limited to a user, a product, an event, or a relationship. Correspondingly, the service data can include, for example, but is not limited to locally collected user feature data, product feature data, event feature data, or relationship feature data, for example, user feature data, service processing data, financial transaction data, product transaction data, or medical health data. For example, the service data can be applied to a service model for model prediction, model training, and other suitable multi-party data joint processing.

In this specification, the service data can include service data based on text data, image data, and/or audio data. Correspondingly, the service model can be applied to service risk identification, service classification, service decision, etc. based on text data, image data, and/or audio data. For example, the local data can be medical data collected by a hospital, and the service model can be used for disease examination or disease diagnosis. Alternatively, the collected local data can include user feature data. Correspondingly, the service model can be applied to service risk identification, service classification, service recommendation, service decision, etc. based on the user feature data. Examples of the service model can include but are not limited to a face recognition model, a disease diagnosis model, a service risk prediction model, a service recommendation model, etc.

In this specification, the local data held by the member devices jointly constitutes modeling data of the service model, and the local data held by each member device is a secret of the member device, and cannot be determined or fully determined by other member devices. In an actual application example, each member device may be, for example, a data storage server or an intelligent terminal device of a service application party or a service application associated party, for example, a local data storage server or an intelligent terminal device of a different financial institution or medical institution.

In this specification, the member devices 310-1 and 310-2 can be any suitable electronic devices with a computing capability. The electronic device includes but is not limited to a personal computer, a server computer, a workstation, a desktop computer, a laptop computer, a notebook computer, a mobile electronic device, a smartphone, a tablet computer, a cellular phone, a personal digital assistant (PDA), a handheld apparatus, a message sending/receiving device, a wearable electronic device, a consumer electronic device, etc.

In addition, the member devices 310-1 and 310-2 respectively include a multicollinearity detection apparatuses 311-1 and 311-2. The multicollinearity detection apparatuses included in the member devices 310-1 and 310-2 can perform network communication through the network 320 for data exchange, and therefore perform cooperative processing to perform a multicollinearity detection process. An operation and a structure of the multicollinearity detection apparatus are described in detail below with reference to the accompanying drawings.

In some embodiments, the network 320 can be any one or more of a wired network or a wireless network. Examples of the network 320 can include but are not limited to a cable network, an optical fiber network, a telecommunications network, an intranet, the Internet, a local area network (LAN), a wide area network (WAN), a wireless local area network (WLAN), a metropolitan area network (MAN), a public switched telephone network (PSTN), a Bluetooth network, a ZigBee network (ZigZee), near field communication (NFC), an intra-device bus, an intra-device line, etc., or any combination thereof.

Figure 4:
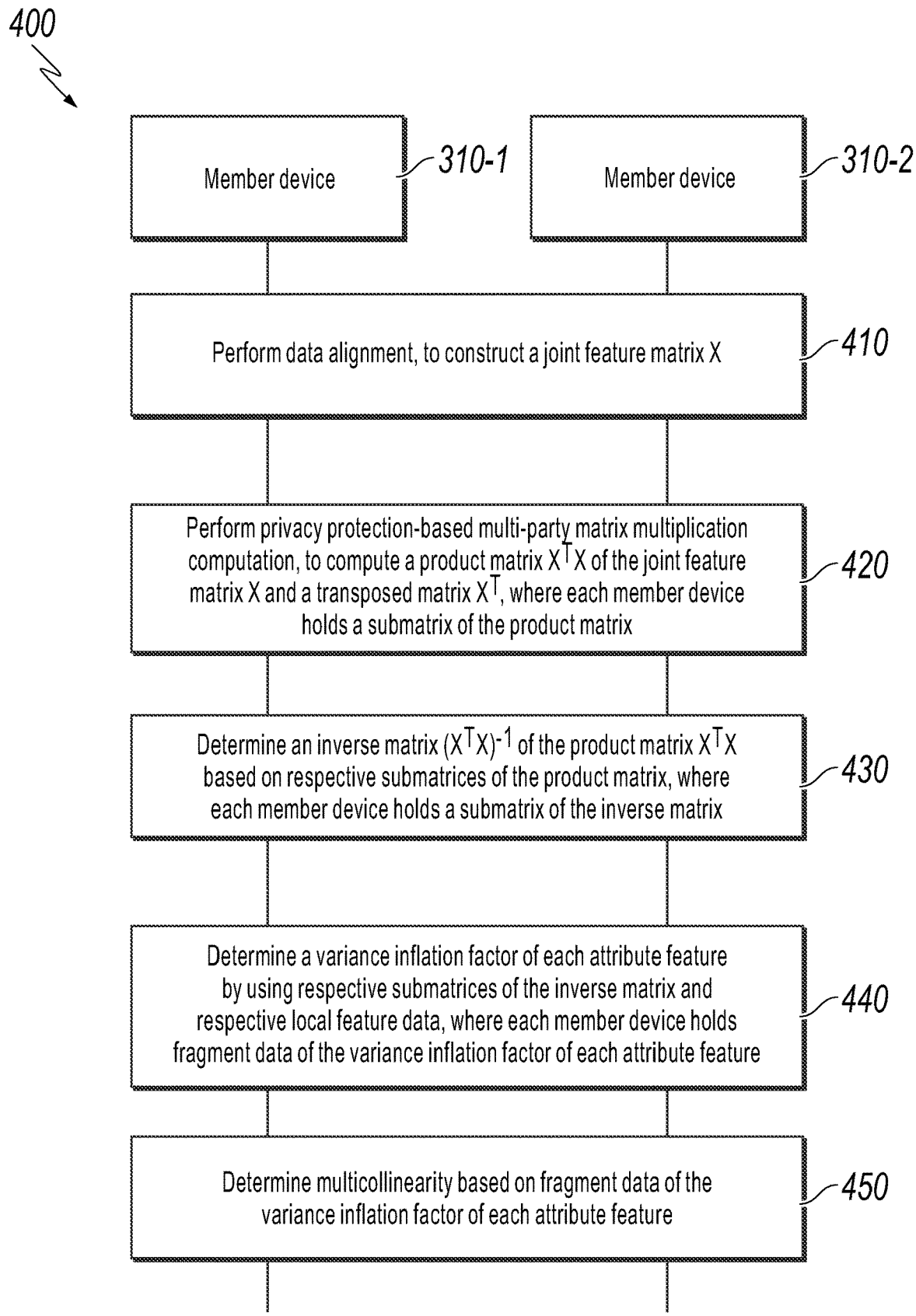
FIG. 4 is a flowchart illustrating a privacy protection-based multicollinearity detection method, according to embodiments of this specification.

FIG. 4 is a flowchart illustrating a privacy protection-based multicollinearity detection method 400, according to embodiments of this specification. In the multicollinearity detection method 400 shown in FIG. 4, a member device 310-1 holds local feature data $X_A$, and a member device 310-2 holds local feature data $X_B$. Each of the local feature data $X_A$ and the local feature data $X_B$ held by the member devices 310-1 and 310-2 can be a horizontally sharded data sample set or a vertically sharded data sample set. Each of the local feature data $X_A$ and the local feature data $X_B$ of the member devices 310-1 and 310-2 is an attribute feature matrix formed by arranging raw data in columns. Each row represents one data sample, and each column represents one attribute feature.

As shown in FIG. 4, in 410, the member devices 310-1 and 310-2 perform data alignment on the respective local feature data, to construct a joint feature matrix X. In the constructed joint feature matrix X, the respective local feature data (local feature data matrix) of the member device 310-1 and the member device 310-2 constitutes some elements of the joint feature matrix X, is locally stored, and is not disclosed to the other member devices.

In an example of vertical data sharding, during data alignment, the local feature data $X_A$ of the member device 310-1 and the local feature data $X_B$ of the member device 310-2 are stacked and spliced, to obtain the joint matrix $X=(X_A, X_B)$. A quantity of features and a quantity of samples of the obtained joint matrix X are respectively $p=p_A+p_B$ and $n=n_A=n_B$, where $p_A$ and $n_A$ are respectively a quantity of features and a quantity of samples of $X_A$, and $p_B$ and $n_B$ are respectively a quantity of features and a quantity of samples of $X_B$.

In an example of horizontal data sharding, during data alignment, the local feature data $X_A$ of the member device 310-1 and the local feature data $X_B$ of the member device 310-2 are stacked and spliced, to obtain the joint matrix $$X = \begin{pmatrix} X_A \\ X_B \end{pmatrix}.$$

A quantity of features and a quantity of samples of the obtained joint matrix X are respectively $p=p_A=p_B$ and $n=n_A+n_B$, where $p_A$ and $n_A$ are respectively a quantity of features and a quantity of samples of $X_A$, and $p_B$ and $n_B$ are respectively a quantity of features and a quantity of samples of $X_B$.

In addition, optionally, in an example, the member device 310-1 and the member device 310-2 can perform data alignment on the respective local feature data by using a private set intersection (PSI) protocol, to construct the joint feature matrix X.

After the joint feature matrix X is constructed by performing data alignment on the local feature data of the member devices, in 420, the member devices jointly perform privacy protection-based multi-party matrix multiplication computation, to compute a product matrix $X^TX$ of the joint feature matrix X and a transposed matrix $X^T$ of the joint feature matrix, where each member device holds a submatrix of the product matrix $X^TX$.

Before an implementation example of the privacy protection-based multi-party matrix multiplication computation according to the embodiments of this specification is described, a secret sharing-based two-party matrix multiplication process is first briefly described.

A secret sharing method is a cryptographic technology in which a secret is divided for storage. In the method, a secret is appropriately divided into a plurality of secret shares (shares, which may also be referred to as "fragments"), each secret share is held and managed by one of a plurality of participants (data holders), a single participant cannot restore the complete secret, and the complete secret can be restored only when several participants cooperate. The secret sharing method is intended to prevent a secret from being centrally held, to spread a risk and implement intrusion tolerance.

Figure 5:
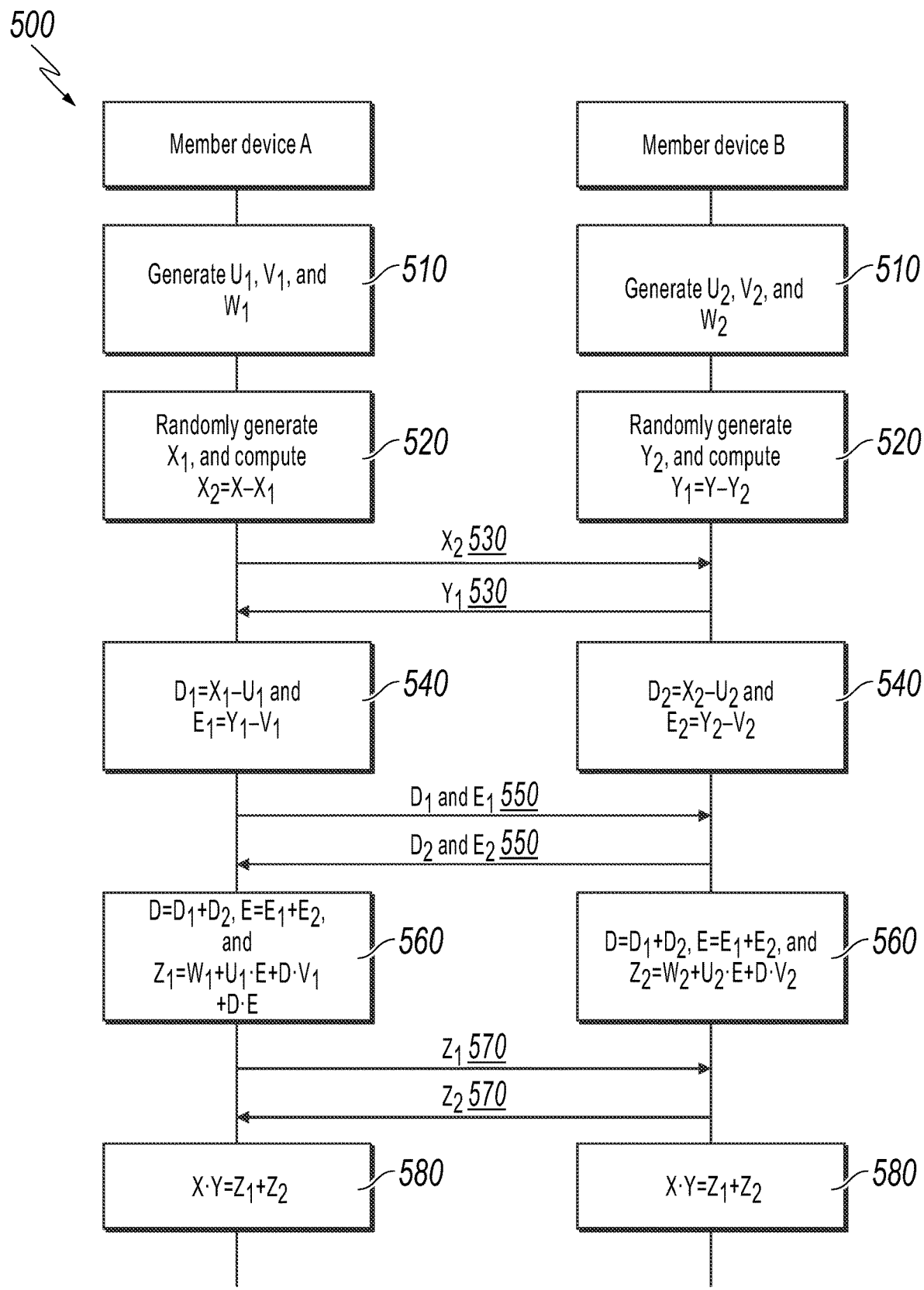
FIG. 5 is an example flowchart illustrating a secret sharing-based two-party matrix multiplication process.

FIG. 5 is an example flowchart illustrating a secret sharing-based two-party matrix multiplication process. In an example in FIG. 5, assume that there are two member devices A and B, the member device A holds a matrix X, and the member device B holds a matrix Y. Assume that dimensions of the matrices X and Y are respectively n×k and k×m.

As shown in FIG. 5, in 510, random matrices $U_1$, $V_1$, and $W_1$ are generated at the member device A; and random matrices $U_2$, $V_2$, and $W_2$ are generated at the member device B. Here, dimensions of $U_1$ and $U_2$ are n×k, dimensions of $V_1$ and $V_2$ are k×m, and dimensions of $W_1$ and $W_2$ are n×m.

In 520, at the member device A, a matrix $X_1$ is randomly generated, a dimension of the matrix $X_1$ is the same as the dimension of the matrix X, and a difference $X_2=X-X_1$ between the matrix X and the matrix $X_1$ is computed; and at the member device B, a matrix $Y_2$ is randomly generated, a dimension of the matrix $Y_2$ is the same as the dimension of the matrix Y, and a difference $Y_1=Y-Y_2$ between the matrix Y and the matrix $Y_2$ is computed.

In 530, the member device A sends the matrix $X_2$ to the member device B, and the member device B sends the matrix $Y_1$ to the member device A.

In 540, $D_1=X_1-U_1$ and $E_1=Y_1-V_1$ are computed at the member device A; and $D_2=X_2-U_2$ and $E_2=Y_2-V_2$ are computed at the member device B.

In 550, the member device A sends the matrices $D_1$ and $E_1$ to the member device B, and the member device B sends the matrices $D_2$ and $E_2$ to the member device A.

In 560, $D=D_1+D_2$, $E=E_1+E_2$, and $Z_1=+U_1 \cdot E+D \cdot V_1+D \cdot E$ are computed at the member device A; and $D=D_1+D_2$, $E=E_1+E_2$, and $Z_2=W_2+U_2 \cdot E+D \cdot V_2$ are computed at the member device B.

In 570, the member device A sends the matrix $Z_1$ to the member device B, and the member device B sends the matrix $Z_2$ to the member device A.

In 580, at the member devices A and B, summation is performed on the matrices $Z_1$ and $Z_2$, to obtain a product $X \cdot Y = Z_1 + Z_2$ of the matrices X and Y.

An implementation example of the secret sharing-based matrix multiplication is described above with reference to FIG. 5. An implementation example of the privacy protection-based multi-party matrix multiplication computation according to the embodiments of this specification is described below. In this specification, examples of the privacy protection-based multi-party matrix multiplication computation can include but are not limited to multi-party block matrix multiplication or multi-party secret sharing transposed matrix multiplication.

Figure 6:
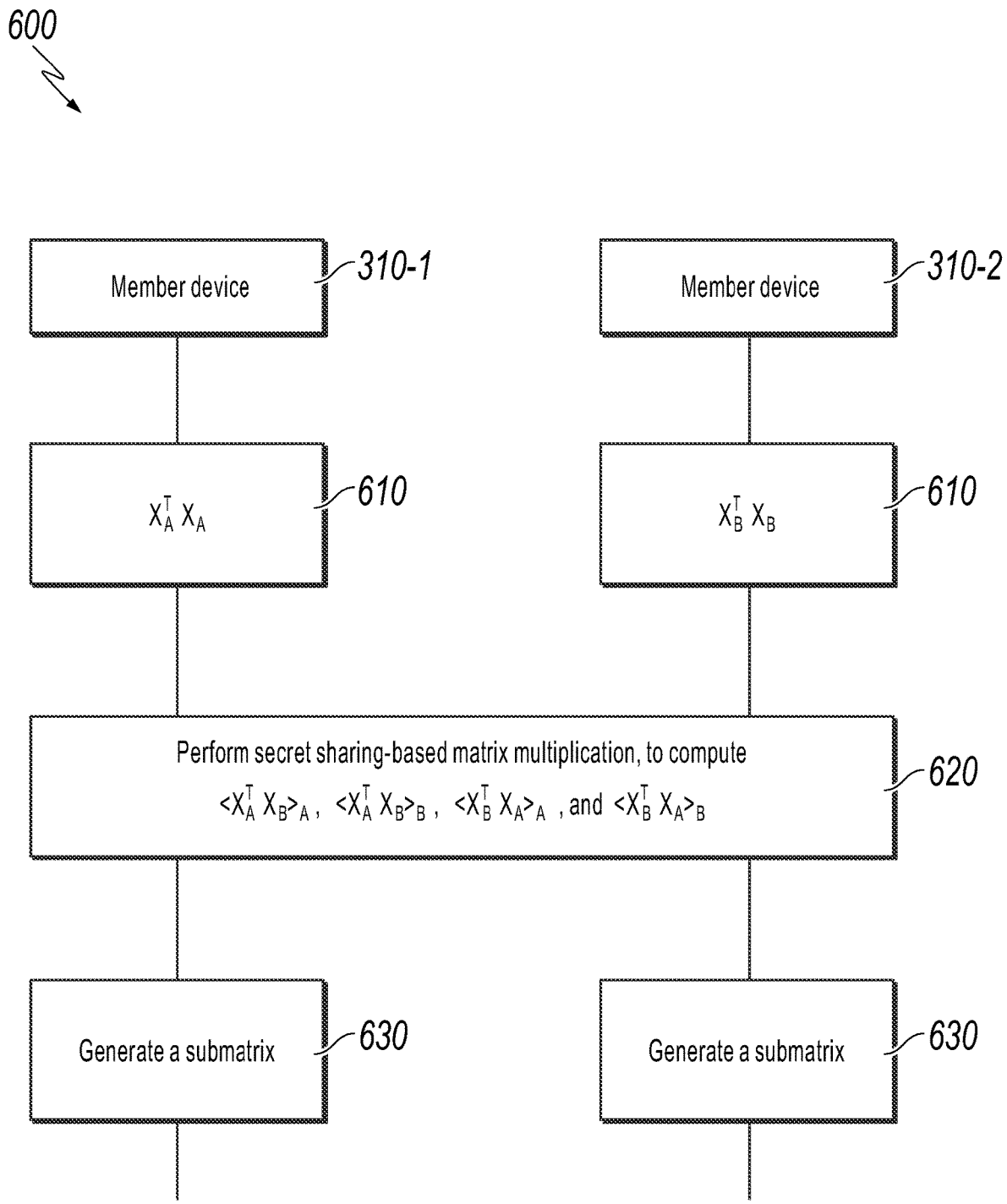
FIG. 6 is an example flowchart illustrating a two-party block matrix multiplication process, according to embodiments of this specification.

FIG. 6 is an example flowchart illustrating a two-party block matrix multiplication process, according to embodiments of this specification. In the embodiment in FIG. 6, the member device 310-1 holds a local feature matrix $X_A$, and the member device 310-2 holds a local feature matrix $X_B$.

As shown in FIG. 6, in 610, at the member devices 310-1 and 310-2, local matrix multiplication computation is respectively performed, to obtain product matrices $X_A^T X_A$ and $X_B^T X_B$.

In 620, the member devices 310-1 and 310-2 perform secret sharing-based matrix multiplication computation by using $X_A$, $X_A^T$, $X_B$, and 4, the member device 310-1 obtains submatrices $<X_A^T X_B>_A$ and $<X_B^T X_A>_A$ of $X_A^T X_B$ and $X_B^T X_A$, and the member device 310-1 obtains submatrices $<X_A^T X_B>_B$ and $<X_B^T X_A>_B$ of $X_A^T X_B$ and $X_B^T X_A$.

In 630, the member device 310-1 generates a submatrix $$\langle X^T X \rangle_A = \begin{bmatrix} X_A^T X_A & \langle X_A^T X_B \rangle_A \\ \langle X_B^T X_A \rangle_A & 0 \end{bmatrix}$$

of a product matrix $X^T X$ based on $X_A^T X_A$, the submatrix $<X_A^T X_B>_A$, and $<X_B^T X_A>_A$; and the member device 310-2 generates a submatrix $$\langle X^T X \rangle_A = \begin{bmatrix} 0 & \langle X_A^T X_B \rangle_B \\ \langle X_B^T X_A \rangle_B & X_B^T X_B \end{bmatrix}$$

of the product matrix $X^T X$ based on $X_B^T X_B$, the submatrix $<X_A^T X_B>_B$, and $<X_B^T X_A>_B$. Here, $<X_B^T X_A>_A$ and $<X_B^T X_A>_B$ can be alternatively respectively denoted as $<X_A^T X_B>_A^T$ and $<X_A^T X_B>_B^T$.

Figure 7:
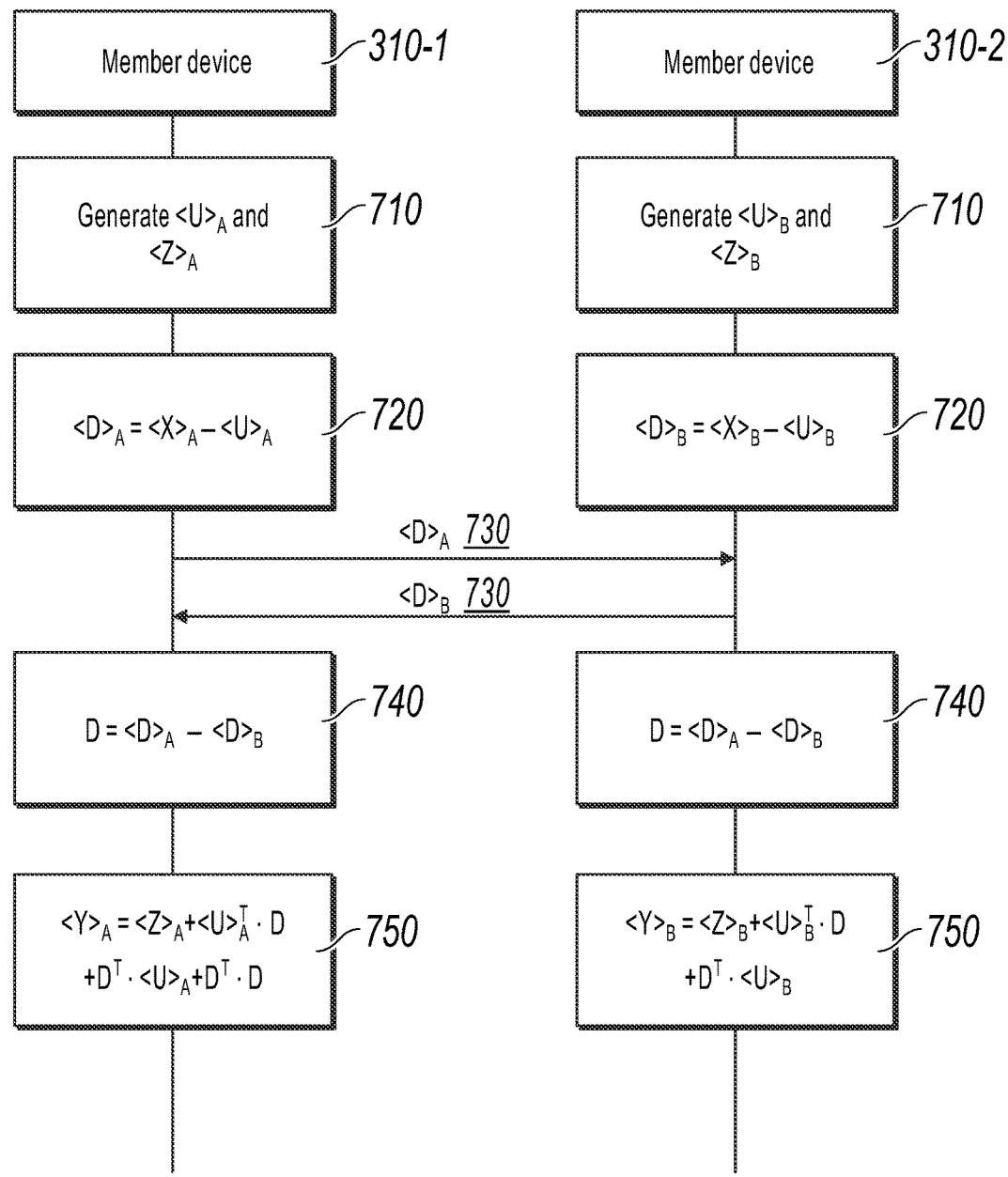
FIG. 7 is an example flowchart illustrating a two-party secret sharing transposed matrix multiplication process, according to embodiments of this specification.

FIG. 7 is an example flowchart illustrating a two-party secret sharing transposed matrix multiplication process, according to embodiments of this specification. Secret sharing transposed matrix multiplication can also be referred to as secret sharing Gram matrix computation. For a given real matrix X, a matrix $X^T X$ is a Gram matrix of a column vector of the matrix X.

As shown in FIG. 7, in 710, the member devices 310-1 and 310-2 perform secret sharing block processing on a matrix $U_{n \times p}$, and therefore a submatrix $<U>_A$ of the matrix $U_{n \times p}$ is obtained at the member device 310-1, and a submatrix $<U>_B$ of the matrix $U_{n \times p}$ is obtained at the member device 310-2. Then, the member devices 310-1 and 310-2 perform matrix computation $Z = U^T U$ by using the respective submatrices $<U>_A$ and $<U>_B$, to obtain respective matrices $<Z>_A$ and $<Z>_B$.

In 720, $<D>_A = <X>_A - <U>_A$ is computed at the member device 310-1; and $<D>_B = <X>_B - <U>_B$ is computed at the member device 310-2.

In 730, the member device 310-2 sends the matrix $<D>_A$ to the member device 310-2, and the member device 310-2 sends the matrix $<D>_B$ to the member device 310-2.

In 740, $D = <D>_A - <D>_B$ is computed at each of the member devices 310-1 and 310-2.

In 750, $<Y>_A = <Z>_A + <U>_A^T \cdot D + D^T \cdot <U>_A + D^T \cdot D$ is computed at the member device 310-1; and $<Y>_B = <Z>_B + <U>_B^T \cdot D + D^T \cdot <U>_B$ is computed at the member device 310-2.

Going back to FIG. 4. After respective submatrices of the product matrix are obtained, in 430, the member devices 310-1 and 310-2 determine an inverse matrix $(X^T X)^{-1}$ of the product matrix $X^T X$ based on the respective submatrices of the product matrix, where each member device holds a submatrix of the inverse matrix $(X^T X)^{-1}$.

Optionally, in an example, the member devices 310-1 and 310-2 can determine the inverse matrix $(X^T X)^{-1}$ of the product matrix $X^T X$ by using a Newton's method and based on the respective submatrices of the product matrix. Each member device holds the submatrix of the inverse matrix $(X^T X)^{-1}$, and in each Newton's iteration process, a matrix product of the submatrices of the product matrix of the member devices is implemented based on secret sharing matrix computation.

The method for computing the inverse matrix and implemented by using the Newton's method is described below by using two participants as an example.

Assume that there is a matrix A, the matrix A is a positive definite matrix, and participants A and B respectively hold matrices $<A>_A$ and $<A>_B$ of the matrix A, where $A = <A>_A + <A>_B$. When the inverse matrix is determined by using the Newton's method, the inverse matrix is obtained by performing K times of iteration computation. An iteration equation $X_{k+1} = X_k \cdot (2*I - A \cdot X_k) = (<X_k>_A + <X_k>_B) \cdot (2*I - (<A>_A + <A>_B) \cdot (<X_k>_A + <X_k>_B))$ is used in each round of iteration computation. An initial value of X is $X_0 = tr(A)^{-1} = (tr(<A>_A) + tr(<A>_B))^{-1}$, where tr(A) represents a trace of the matrix A. It is worthwhile to note that the quantity K of iterations is a hyperparameter, and is usually set between 20 and 32.

It is worthwhile to note that it is merely an example embodiment to determine the inverse matrix by using the Newton's method. In other embodiments, the inverse matrix can be determined by using other algorithms in the art.

After the inverse matrix $(X^T X)^{-1}$ of the product matrix $X^T X$ is determined, in 440, the member devices determine a variance inflation factor of each attribute feature by using respective submatrices of the inverse matrix and the respective local feature data, where each member device holds fragment data of the variance inflation factor of each local attribute feature.

Figure 8:
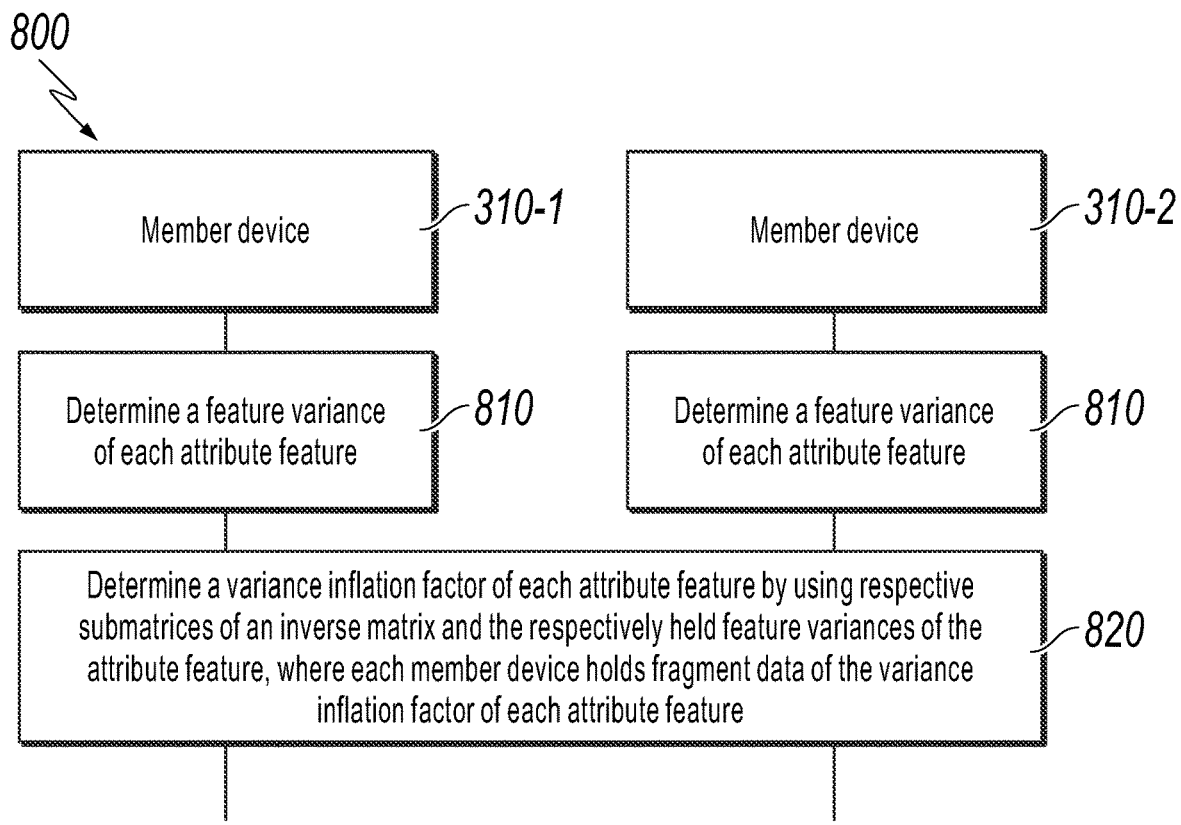
FIG. 8 is an example schematic diagram illustrating a process of determining a variance inflation factor in the case of vertical data sharding, according to embodiments of this specification.

FIG. 8 is an example schematic diagram illustrating a process of determining a variance inflation factor in the case of vertical data sharding, according to embodiments of this specification.

As shown in FIG. 8, in 810, at the member devices 310-1 and 310-2, feature variances of each attribute feature that are held by the member devices 310-1 and 310-2 are respectively determined by using the local feature data. In the case of vertical data sharding, sample data that corresponds to the attribute feature and held by each member device is locally stored, and therefore each member device can determine the locally held feature variance of the attribute feature by performing local computation.

In 820, the member devices 310-1 and 310-2 determine the variance inflation factor $VIF_i$ of each attribute feature i based on an equation $VIF_i=(X^TX)_{ii}^{-1}(n-1)Var(X_i)$ and by using the respective submatrices of the inverse matrix and the respectively held feature variances of the attribute feature, where the member devices 310-1 and 310-2 respectively hold the fragment data of the variance inflation factor $VIF_i$ of each attribute feature i, represents the ith element (namely, an element in the ith row and the ith column of $(X^TX)^{-1}$) on the diagonal of the inverse matrix $(X^TX)^{-1}$, and n is a total quantity of pieces of sample data. In addition, a product of $(X^TX)_{ii}^{-1}$ and $Var(X_i)$ is obtained by performing secret sharing multiplication by the member devices by using corresponding fragment elements in the respective submatrices of the inverse matrix and the respectively held feature variances.

Furthermore, optionally, in another example, the member devices 310-1 and 310-2 can reconstruct the inverse matrix $(X^TX)^{-1}$ by using the respective submatrices of the inverse matrix. Then, each of the member devices 310-1 and 310-2 locally determines the locally held variance inflation factor $VIF_i$ of each attribute feature i based on the equation $VIF_i=(X^TX)_{ii}^{-1}(n-1)Var(X_i)$, where $(X^TX)_{ii}^{-1}$ represents the ith element on the diagonal of the inverse matrix $(X^TX)^{-1}$, and n is the total quantity of pieces of sample data.

Figure 9:
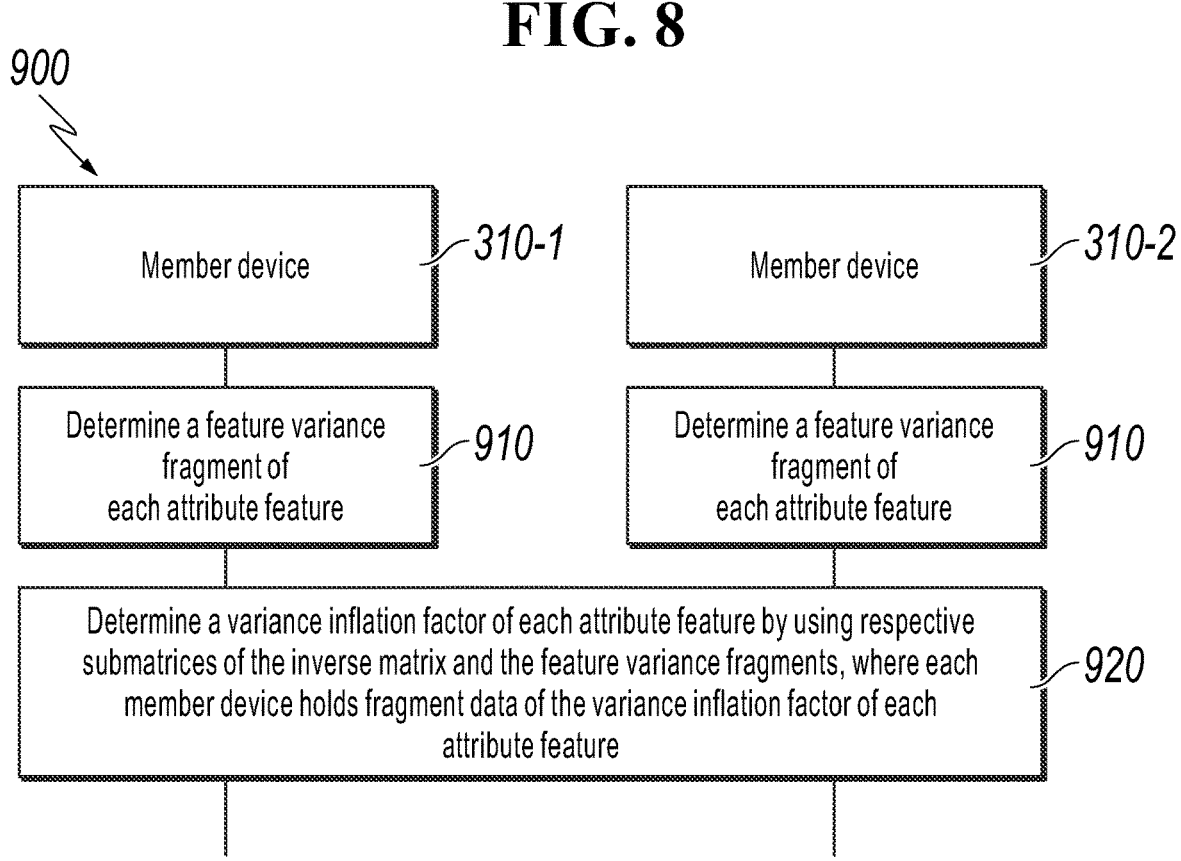
FIG. 9 is an example schematic diagram illustrating a process of determining a variance inflation factor in the case of horizontal data sharding, according to embodiments of this specification.

FIG. 9 is an example schematic diagram illustrating a process of determining a variance inflation factor in the case of horizontal data sharding, according to embodiments of this specification.

As shown in FIG. 9, in 910, at the member devices 310-1 and 310-2, feature variance fragments of a feature variance $Var(X_i)$ of each attribute feature i at the member devices 310-1 and 310-2 are respectively locally determined by using the local feature data. Specifically, the feature variance of the attribute feature i is $$Var(X_i) = \frac{\sum_{m \in A} x_m + \sum_{k \in B} x_k}{n} = \frac{\sum_{m \in A} x_m}{n} + \frac{\sum_{k \in B} x_k}{n},$$

where $$\frac{\sum_{m \in A} x_m}{n}$$

is the feature variance fragment of $Var(X_i)$ at the member device 310-1, and $$\frac{\sum_{k \in B} x_k}{n}$$

is the feature variance fragment of $Var(X_i)$ at the member device 310-2.

In 920, the member devices 310-1 and 310-2 determine the variance inflation factor $VIF_i$ of each attribute feature i based on an equation $VIF_i=(X^TX)_{ii}^{-1}(n-1)Var(X_i)$ and by using the respective submatrices of the inverse matrix and the respective feature variance fragments of each attribute feature i, where the member devices 310-1 and 310-2 respectively hold the fragment data of the variance inflation factor $VIF_i$ of each attribute feature i, $(X^TX)_{ii}^{-1}$ represents the ith element on the diagonal of the inverse matrix $(X^TX)^{-1}$, and n is a total quantity of pieces of sample data.

In addition, a product of $(X^TX)_{ii}^{-1}$ and $Var(X_i)$ is obtained by performing secret sharing multiplication by the member devices 310-1 and 310-2 by using corresponding fragment elements in the respective submatrices of the inverse matrix and the respective feature variance fragments.

Going back to FIG. 4. After the fragment data of the variance inflation factor of each attribute feature is obtained, in 450, the member devices 310-1 and 310-2 determine multicollinearity based on the respectively held fragment data of the variance inflation factor of each attribute feature.

For example, the member devices 310-1 and 310-2 reconstruct the variance inflation factor of each attribute feature i based on the respectively held fragment data of the variance inflation factor of each attribute feature. For example, based on actual needs, a member device that holds the fragment data of the variance inflation factor of each attribute feature can reconstruct the variance inflation factor of the attribute feature, and send the variance inflation factor of the attribute feature to a designated member device, and the designated member device determines whether there is multicollinearity. Alternatively, when the variance inflation factor for the attribute feature is reconstructed at each member device, each member device determines whether there is multicollinearity. A process of reconstructing the variance inflation factor can be implemented by using a privacy protection-based reconstruction method. When the reconstructed variance inflation factor $VIF_i$ of the attribute feature i is less than a first reference value, it is determined that there is no multicollinearity for the attribute feature i. When the reconstructed variance inflation factor $VIF_i$ of the attribute feature i is not less than a first reference value and less than a second reference value, it is determined that there is level-1 multicollinearity for the attribute feature i. When the reconstructed variance inflation factor $VIF_i$ of the attribute feature i is not less than a second reference value, it is determined that there is level-2 multicollinearity for the attribute feature i. Compared with level-1, level-2 indicates a higher degree of multicollinearity. For example, level-2 can mean that the multicollinearity has reached a degree that the modeling feature needs optimization. Here, in an example, the first reference value can be, for example, 10, and the second reference value can be 100. In other examples, other suitable values may be used for the first reference value and the second reference value.

In addition, optionally, when the local feature data of each member device is modeling data of a regression model, after the multicollinearity of each attribute feature is determined, a modeling feature of the modeling data can be optimized. In this specification, examples of the regression model can include but are not limited to a linear regression model and a logical regression model.

For example, when it is determined there is the multicollinearity for the attribute feature i, the attribute feature i can be removed from a modeling feature of the regression model, or the attribute feature i and other related modeling features of the regression model are combined into a single modeling feature.

Optionally, in an example, modeling of the linear regression model can be performed by using the attribute features i as a dependent variable and other modeling features as independent variables, and a correlation between the other modeling features and the attribute features i is determined based on a value of a regression coefficient in the linear regression model after modeling. As such, a modeling feature in a high correlation with the attribute features i is selected to be combined with the attribute features i into a single feature. Alternatively, a test of significance on the regression variable is performed for other modeling features by using the attribute feature i as a dependent variable and based on privacy protection, to compute a p-value, a modeling feature in correlation with the attribute feature i is selected based on the computed p-value, and the selected modeling feature and the attribute feature i are combined into a single feature. For example, a modeling feature whose computed p-value is less than a predetermined threshold (for example, 0.05) can be determined as a modeling feature in correlation with the attribute feature i.

The multicollinearity detection method according to the embodiments of this specification is described above with reference to FIG. 1 to FIG. 9.

In the multicollinearity detection solution, the member devices perform data alignment on the respective local feature data, to construct the joint feature matrix; collaboratively perform privacy protection-based multi-party secure computation, to obtain the product matrix of the joint feature matrix and the transposed matrix of the joint feature matrix and obtain the inverse matrix of the product matrix, where each member device holds the submatrix; and determine the variance inflation factor of each attribute feature by using the respective submatrices of the inverse matrix and the respective local feature data, to perform multicollinearity detection. As such, it can be ensured that private data of each member device is protected, the complexity of a process of determining the variance inflation factor can be reduced, and the detection accuracy and detection efficiency of multicollinearity detection can be improved.

In addition, in the multicollinearity detection solution, the inverse matrix of the product matrix is determined by using the Newton's method, and therefore a problem that when obtaining an inverse matrix for a multicollinearity matrix, there is no inverse matrix or there is an error in computing a pseudo inverse special value can be overcome. Furthermore, in the Newton's method, only secret multiplication and secret addition need to be performed in an iteration process, and therefore a problem that a normal method (svd, etc.) for obtaining an inverse matrix of a matrix cannot be performed during secret computation or it is very costly to perform a normal method for obtaining an inverse matrix of a matrix during secret computation can be resolved. In addition, in the Newton's method, secure numerical inversion is applied to an initialization solution to compute a trace fragment of a matrix. In this efficient initialization solution, a quantity of subsequent iterations can be greatly reduced, and the detection efficiency of multicollinearity detection can be further improved.

Furthermore, in the multicollinearity detection solution, data alignment is performed on the respective local feature data by using the private set intersection protocol, and therefore security of the private data at each member device can be further improved.

Figure 10:
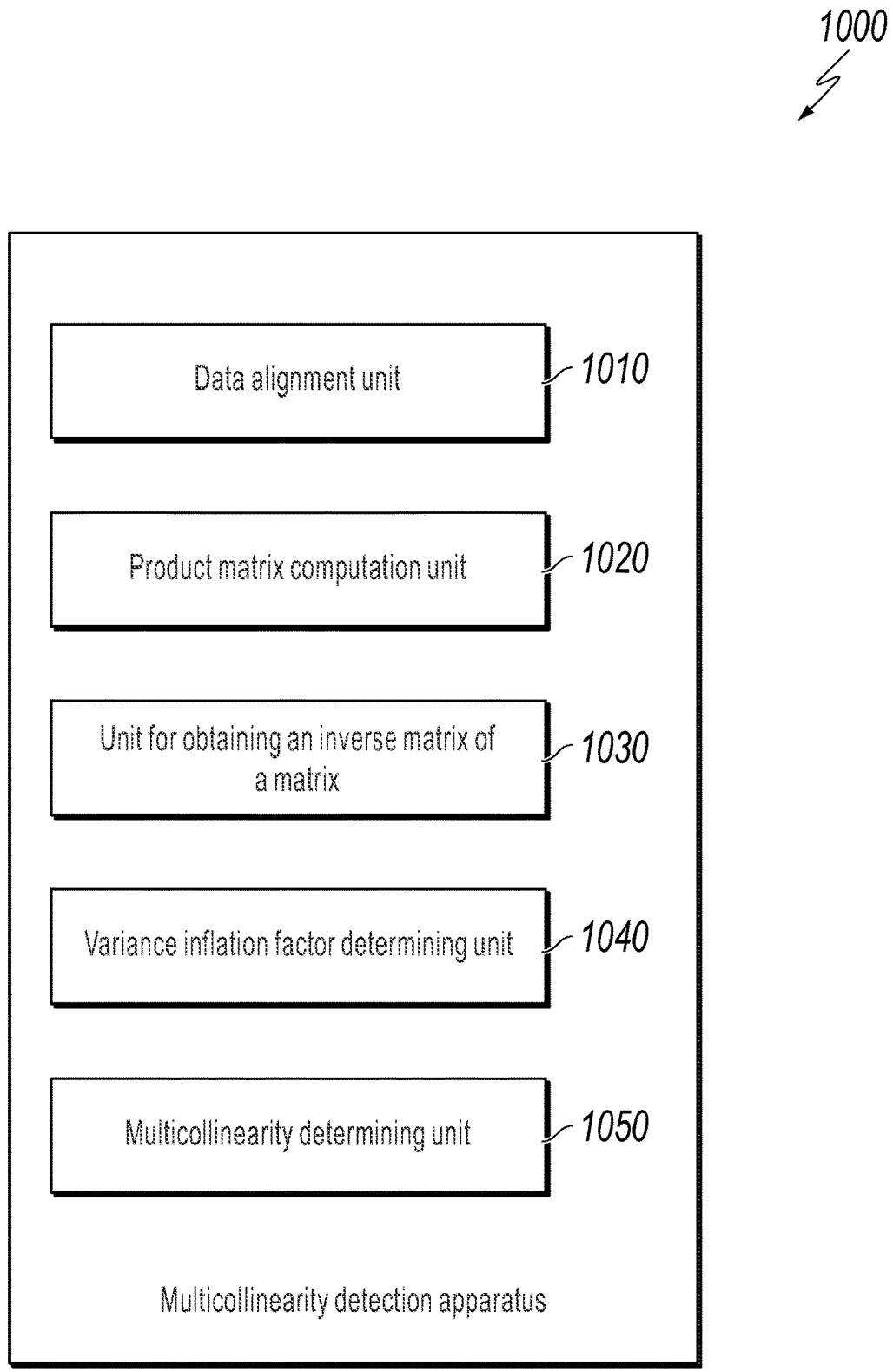
FIG. 10 is a block diagram illustrating a multicollinearity detection apparatus applied to a member device, according to embodiments of this specification.

FIG. 10 is a block diagram illustrating a multicollinearity detection apparatus 1000 applied to a member device, according to embodiments of this specification. As shown in FIG. 10, the multicollinearity detection apparatus 1000 includes a data alignment unit 1010, a product matrix computation unit 1020, a unit for obtaining an inverse matrix of a matrix 1030, a variance inflation factor determining unit 1040, and a multicollinearity determining unit 1050. The multicollinearity detection apparatus 1000 is applied to each of a plurality of member devices.

The data alignment unit 1010 is configured to perform data alignment on respective local feature data with the other member devices, to construct a joint feature matrix. Optionally, in an example, the data alignment unit 1010 can be configured to perform data alignment on the respective local feature data with the other member devices by using a private set intersection protocol, to construct the joint feature matrix.

The product matrix computation unit 1020 is configured to perform privacy protection-based multi-party matrix multiplication computation with the other member devices, to obtain a product matrix of a transposed matrix of the joint feature matrix and the joint feature matrix. Each member device holds a submatrix of the product matrix. Examples of the privacy protection-based multi-party matrix multiplication computation can include but are not limited to multi-party block matrix multiplication or multi-party secret sharing transposed matrix multiplication.

The unit for obtaining an inverse matrix of a matrix 1030 is configured to determine an inverse matrix of the product matrix with the other member devices based on respective submatrices of the product matrix. Each member device holds a submatrix of the inverse matrix. Optionally, in an example, the unit for obtaining an inverse matrix of a matrix 1030 can be configured to determine the inverse matrix of the product matrix with the other member devices by using a Newton's method and based on the respective submatrices of the product matrix. Each member device holds the submatrix of the inverse matrix, and in each Newton's iteration process, a matrix product of the submatrices of the product matrix of the member devices is implemented based on secret sharing matrix computation.

The variance inflation factor determining unit 1040 is configured to determine a variance inflation factor of each attribute feature with the other member devices by using respective submatrices of the inverse matrix and the respective local feature data. Each member device holds fragment data of the variance inflation factor of each attribute feature.

The multicollinearity determining unit 1050 is configured to determine multicollinearity with the other member devices based on respectively held fragment data of the variance inflation factor of each attribute feature.

Figure 11:
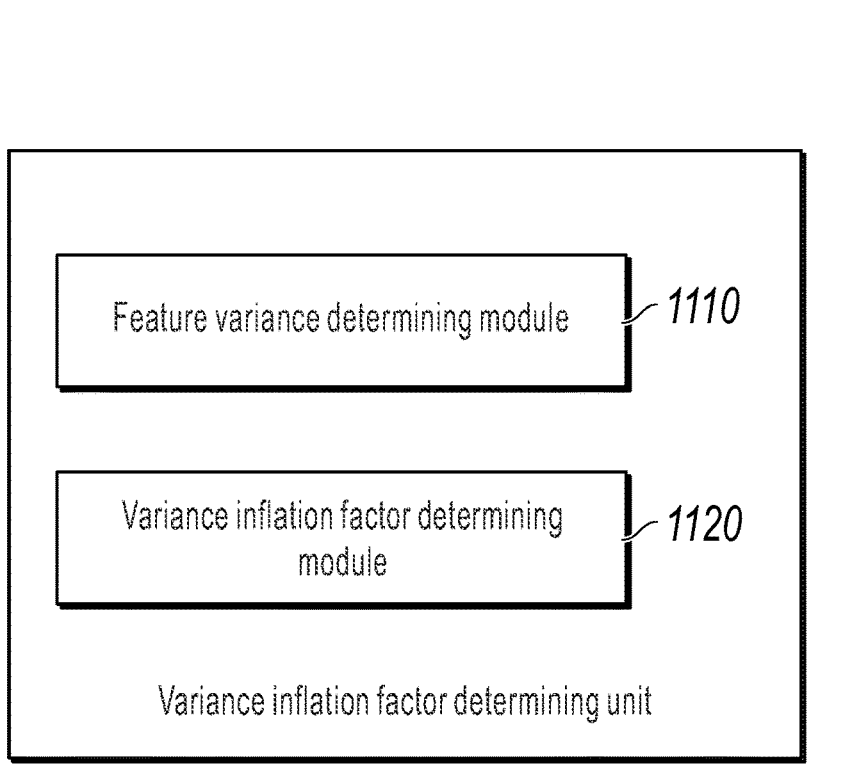
FIG. 11 is a block diagram illustrating an implementation example of a variance inflation factor determining unit, according to embodiments of this specification.

FIG. 11 is a block diagram illustrating an implementation example of a variance inflation factor determining unit 1100, according to embodiments of this specification. In the embodiment shown in FIG. 11, the local feature data of each member device is local feature data based on vertical data sharding.

As shown in FIG. 11, the variance inflation factor determining unit 1100 includes a feature variance determining module 1110 and a variance inflation factor determining module 1120.

The feature variance determining module 1110 is configured to determine, by using the local feature data, a feature variance that is of each attribute feature and held by the member device.

The variance inflation factor determining module 1120 is configured to determine the variance inflation factor $VIF_i$ of each attribute feature i with the other member devices based on an equation $VIF_i = (X^T X)_{ii}^{-1} (n-1) Var(X_i)$ and by using the respective submatrices of the inverse matrix and respectively held feature variances of the attribute feature, where each member device holds the fragment data of the variance inflation factor $VIF_i$ of each attribute feature i, X is the joint feature matrix, $X^T$ is the transposed matrix of the joint feature matrix, $(X^T X)_{ii}^{-1}$ represents the ith element on the diagonal of the inverse matrix $(X^T X)^{-1}$, $Var(X_i)$ is the feature variance of the attribute feature i, n is a total quantity of pieces of sample data, a product of $(X^T X)_{ii}^{-1}$ and $Var(X_i)$ is obtained by performing secret sharing multiplication by the member devices by using corresponding fragment elements in the respective submatrices of the inverse matrix and the respectively held feature variances, and feature variances of the attribute feature that are held by the other member devices are determined by the member device based on the local feature data.

Optionally, in an example, the variance inflation factor determining module 1120 is configured to reconstruct the inverse matrix $(X^TX)^{-1}$ with the other member devices by using the respective submatrices of the inverse matrix, and then locally determine the held variance inflation factor $VIF_i$ of each attribute feature i based on the equation $VIF_i=(X^TX)_{ii}^{-1}(n-1)Var(X_i)$, where $(X^TX)_{ii}^{-1}$ represents the ith element on the diagonal of the inverse matrix $(X^TX)^{-1}$, and n is a total quantity of pieces of sample data.

Figure 12:
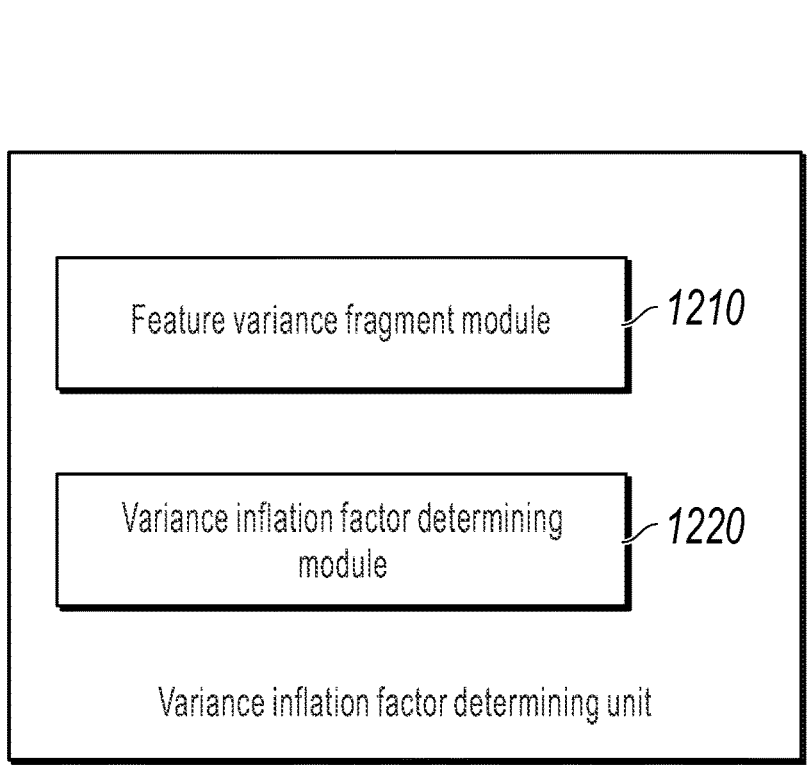
FIG. 12 is a block diagram illustrating another implementation example of a variance inflation factor determining unit, according to embodiments of this specification.

FIG. 12 is a block diagram illustrating an implementation example of a variance inflation factor determining unit 1200, according to embodiments of this specification. In the embodiment shown in FIG. 12, the local feature data of each member device is local feature data based on horizontal data sharding.

As shown in FIG. 12, the variance inflation factor determining unit 1200 includes a feature variance fragment determining module 1210 and a variance inflation factor determining module 1220.

The feature variance fragment determining module 1210 is configured to determine a feature variance fragment of a feature variance $Var(X_i)$ of each attribute feature i at the member device by using the local feature data.

The variance inflation factor determining module 1220 is configured to determine the variance inflation factor $VIF_i$ of each attribute feature i with the other member devices based on an equation $VIF_i=(X^TX)_{ii}^{-1}(n-1)Var(X_i)$ and by using the respective submatrices of the inverse matrix and respectively held feature variance fragments of each attribute feature i, where each member device holds the fragment data of the variance inflation factor $VIF_i$ of each attribute feature i, X is the joint feature matrix, $X^T$ is the transposed matrix of the joint feature matrix, $(X^TX)_{ii}^{-1}$ represents the ith element on the diagonal of the inverse matrix $(X^TX)^{-1}$, n is a total quantity of pieces of sample data, a product of $(X^TX)_{ii}^{-1}$ and $Var(X_i)$ is obtained by performing secret sharing multiplication by the member devices by using corresponding fragment elements in the respective submatrices of the inverse matrix and respective feature variance fragments, and feature variance fragments of the other member devices are determined by using respective local feature data.

In addition, optionally, in an example, when the determined variance inflation factor $VIF_i$ of the attribute feature i is less than a first reference value, the multicollinearity determining unit 1050 determines that there is no multicollinearity for the attribute feature i. When the determined variance inflation factor $VIF_i$ of the attribute feature i is not less than a first reference value and less than a second reference value, the multicollinearity determining unit 1050 determines that there is level-1 multicollinearity for the attribute feature i. When the determined variance inflation factor $VIF_i$ of the attribute feature i is not less than a second reference value, the multicollinearity determining unit 1050 determines that there is level-2 multicollinearity for the attribute feature i.

In addition, optionally, when the local feature data of each member device is modeling data of a regression model, the multicollinearity detection apparatus 1000 can further include a modeling feature optimization unit (not shown). The modeling feature optimization unit is configured to: when it is determined that there is the level-2 multicollinearity for the attribute feature, remove the attribute feature from a modeling feature of the regression model or combine the attribute feature and other related modeling features of the regression model into a single modeling feature.

The multicollinearity detection methods, the multicollinearity detection apparatuses, and the multicollinearity detection systems according to the embodiments of this specification are described above with reference to FIG. 1 to FIG. 12. The multicollinearity detection apparatuses can be implemented by hardware, software, or a combination thereof.

Figure 13:
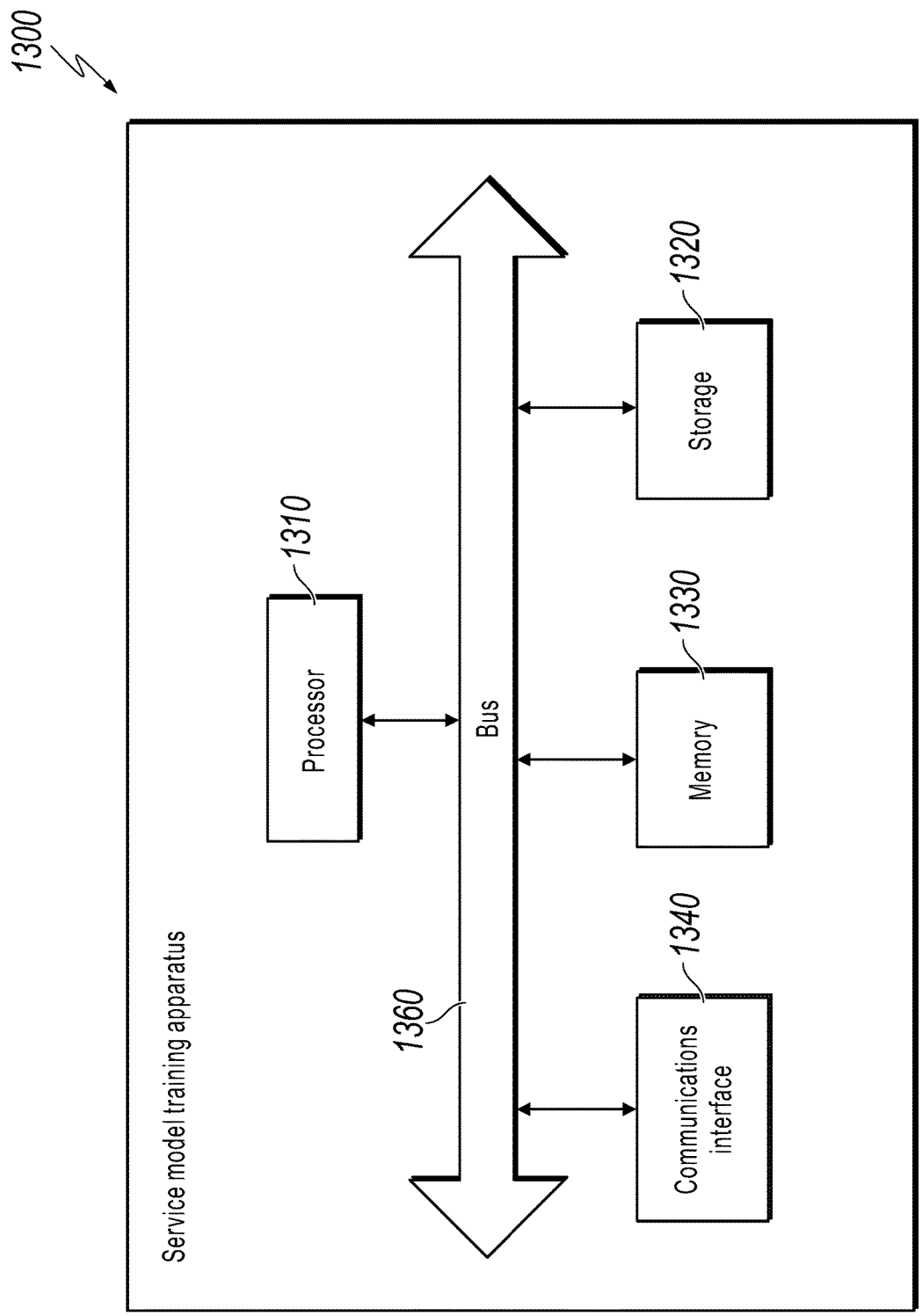
FIG. 13 is a schematic diagram illustrating a multicollinearity detection apparatus that is on a side of a member device and implemented based on a computer, according to embodiments of this specification.

FIG. 13 is a schematic diagram illustrating a multicollinearity detection apparatus 1300 that is on a side of a member device and implemented based on a computer, according to embodiments of this specification. As shown in FIG. 13, the multicollinearity detection apparatus 1300 can include at least one processor 1310, a storage (for example, a nonvolatile memory) 1320, a memory 1330, and a communications interface 1340. The at least one processor 1310, the storage 1320, the memory 1330, and the communications interface 1340 are connected by using a bus 1360. The at least one processor 1310 executes at least one computer-readable instruction (namely, an element implemented in a software form) stored or encoded in the storage.

In some embodiments, a computer program is stored in the storage. When the computer program is executed, the at least one processor 1310 is enabled to implement the following operations: performing data alignment on respective local feature data with the other member devices, to construct a joint feature matrix; performing privacy protection-based multi-party matrix multiplication computation with the other member devices, to obtain a product matrix of a transposed matrix of the joint feature matrix and the joint feature matrix, where each member device holds a submatrix of the product matrix; determining an inverse matrix of the product matrix with the other member devices based on respective submatrices of the product matrix, where each member device holds a submatrix of the inverse matrix; determining a variance inflation factor of each attribute feature with the other member devices by using respective submatrices of the inverse matrix and the respective local feature data, where each member device holds fragment data of the variance inflation factor of each attribute feature; and determining multicollinearity with the other member devices based on respectively held fragment data of the variance inflation factor of each attribute feature.

It should be understood that when the computer program stored in the storage is executed, the at least one processor 1310 is enabled to perform the operations and functions described above with reference to FIG. 1 to FIG. 12 in the embodiments of this specification.

In some embodiments, a program product such as a computer-readable medium (for example, a non-transitory computer-readable medium) is provided. The computer-readable medium can include a computer program (namely, an element implemented in a software form). When the computer program is executed by a processor, the processor is enabled to perform the operations and functions described above with reference to FIG. 1 to FIG. 12 in the embodiments of this specification. Specifically, a system or an apparatus equipped with a computer-readable storage medium can be provided. The computer-readable storage medium stores software program code for implementing the functions in any of the previous embodiments, and a computer or a processor of the system or the apparatus is enabled to read and execute a computer program stored in the computer-readable storage medium.

In this case, the program code read from the computer-readable medium can implement the functions in any of the previous embodiments, and therefore the computer-readable code and the computer-readable storage medium that stores the computer-readable code form a part of this invention.

Embodiments of the readable storage medium include a floppy disk, a hard disk, a magneto-optical disk, an optical disk (for example, a CD-ROM, a CD-R, a CD-RW, a DVD-ROM, a DVD-RAM, a DVD-RW, or a DVD-RW), a magnetic tape, a nonvolatile memory card, and a ROM. Optionally, the program code can be downloaded from a server computer or a cloud through a communications network.

In some embodiments, a computer program product is provided. The computer program product includes a computer program. When the computer program is executed by a processor, the processor is enabled to perform the operations and functions described above with reference to FIG. 1 to FIG. 12 in the embodiments of this specification.

A person skilled in the art should understand that various variations and modifications can be made to the previously disclosed embodiments without departing from the essence of this invention. Therefore, the protection scope of this invention should be defined by the appended claims.

It is worthwhile to note that not all the steps and units in the previous flowcharts and system structure diagrams are necessary, and some steps or units can be ignored based on actual needs. There is no fixed order of performing the steps, and the order can be determined as needed. The apparatus structure described in the previous embodiments can be a physical structure or a logical structure. That is, some units can be implemented by the same physical entity, or some units can be implemented by a plurality of physical entities, or can be implemented by some components in a plurality of independent devices.

In the previous embodiments, the hardware units or modules can be implemented in mechanical or electrical forms. For example, a hardware unit, module, or processor may include a permanently dedicated circuit or logic (for example, a dedicated processor, an FPGA, or an ASIC) to perform the corresponding operations. The hardware unit or processor can further include programmable logic or a circuit (for example, a general-purpose processor or other programmable processors), and can be provisionally set by software to perform the corresponding operations. Specific implementations (a mechanical form, a dedicated permanent circuit, or a temporarily disposed circuit) can be determined based on cost and time considerations.

The example embodiments are described above in the specific embodiments set forth with reference to the accompanying drawings, but do not represent all embodiments that can be implemented or fall within the protection scope of the claims. The term "example" used throughout this specification means "used as an example, an instance, or an example for illustration", and does not mean "preferred" or "advantageous" over other embodiments. The specific embodiments include specific details to provide an understanding of the described technologies. However, these technologies can be implemented without these specific details. In some examples, to avoid making the concepts of the described embodiments difficult to understand, known structures and apparatuses are shown in forms of block diagrams.

The previous description of this disclosure is provided to enable any person of ordinary skill in the art to implement or use this disclosure. Various modifications to this disclosure are clear to a person of ordinary skill in the art, and the general principles defined here in this specification can also be applied to other variations without departing from the protection scope of this disclosure. Therefore, this disclosure is not limited to the examples and designs described in this specification, but is consistent with the widest range of principles and novelty features disclosed in this specification.

What is claimed is:

1. A computer-implemented method for privacy protection-based multicollinearity detection, comprising:
    performing, by one of at least two member devices, data alignment on respective local feature data with other one or more member devices of the at least two member devices, to construct a joint feature matrix, wherein each of the at least two member devices holds the respective local feature data;
    performing, by the one of at least two member devices, privacy protection-based multi-party matrix multiplication computation with the other one or more member devices, to compute a product matrix of a transposed matrix of the joint feature matrix and the joint feature matrix, wherein each member device holds a submatrix of the product matrix;
    determining, by the one of at least two member devices, an inverse matrix of the product matrix with the other one or more member devices based on respective submatrices of the product matrix, wherein each member device holds a submatrix of the inverse matrix;
    determining, by the one of at least two member devices, a variance inflation factor of each attribute feature with the other one or more member devices using respective submatrices of the inverse matrix and the respective local feature data, wherein each member device holds fragment data of the variance inflation factor of each attribute feature; and
    determining, by the one of at least two member devices, multicollinearity with the other one or more member devices based on respectively held fragment data of the variance inflation factor of each attribute feature.

2. The computer-implemented method of claim 1, wherein determining the inverse matrix of the product matrix with the other one or more member devices based on the respective submatrices of the product matrix comprises:
    determining the inverse matrix of the product matrix with the other one or more member devices using Newton's method and based on the respective submatrices of the product matrix, wherein in each Newton's iteration process, a matrix product of the respective submatrices of the product matrix of the member devices is implemented based on secret sharing matrix computation.

3. The computer-implemented method of claim 1, wherein local feature data of each member device comprises local feature data based on vertical data sharding or local feature data based on horizontal data sharding.

4. The computer-implemented method of claim 3, wherein the local feature data of each member device comprises local feature data based on vertical data sharding, and wherein determining the variance inflation factor of each attribute feature with the other one or more member devices using the respective submatrices of the inverse matrix and the respective local feature data comprises:
    determining, using the local feature data, a feature variance of each attribute feature that is held by the one of the at least two member devices; and
    determining the variance inflation factor of each attribute feature with the other one or more member devices based on the respective submatrices of the inverse matrix and respectively held feature variances of each attribute feature, wherein a product of the respective submatrices of the inverse matrix and respectively held feature variances of each attribute feature is obtained by performing secret sharing multiplication by the member devices using corresponding fragment elements in the respective submatrices of the inverse matrix and respectively held feature variances, and wherein the feature variances of each attribute feature that are held by the other one or more member devices are determined by each member device based on the respective local feature data.

5. The computer-implemented method of claim 3, wherein the local feature data of each member device comprises local feature data based on horizontal data sharding, and wherein determining the variance inflation factor of each attribute feature with the other one or more member devices using the respective submatrices of the inverse matrix and the respective local feature data comprises:

determining, using the local feature data, a feature variance fragment of a feature variance of each attribute feature at the one of the at least two member devices; and determining the variance inflation factor of each attribute feature with the other one or more member devices based on the respective submatrices of the inverse matrix and the feature variance fragment of a feature variance of each attribute feature, wherein a product of the respective submatrices of the inverse matrix and the feature variance fragment of a feature variance of each attribute feature is obtained by performing secret sharing multiplication by the member devices using corresponding fragment elements in the respective submatrices of the inverse matrix and respective feature variance fragments, and wherein the feature variance fragments of the other one or more member devices are determined using respective local feature data.

6. The computer-implemented method of claim 1, wherein the privacy protection-based multi-party matrix multiplication computation comprises one of following multi-party matrix multiplications: multi-party block matrix multiplication or multi-party secret sharing transposed matrix multiplication.

7. The computer-implemented method of claim 1, wherein performing the data alignment on the respective local feature data with the other one or more member devices, to construct the joint feature matrix comprises:

performing the data alignment on the respective local feature data with the other one or more member devices using a private set intersection protocol, to construct the joint feature matrix.

8. The computer-implemented method of claim 1, wherein determining, by the one of at least two member devices, multicollinearity with the other one or more member devices based on respectively held fragment data of the variance inflation factor of each attribute feature, comprises:

reconstructing, as a reconstructed variance inflation factor of each attribute feature, the variance inflation factor of each attribute feature with the other one or more member devices based on respectively held fragment data of the variance inflation factor of each attribute feature;

determining whether the reconstructed variance inflation factor of each attribute feature is less than a first reference value; and in response to determining that the reconstructed variance inflation factor of each attribute feature is less than the first reference value, determining that there is no multicollinearity for each attribute feature; or in response to determining that the reconstructed variance inflation factor of each attribute feature is not less than the first reference value:

determining that the reconstructed variance inflation factor of each attribute feature is less than a second reference value; and in response to determining that the reconstructed variance inflation factor of each attribute feature is not less than the first reference value and less than the second reference value, determining that there is level-1 multicollinearity for each attribute feature; or in response to determining that the reconstructed variance inflation factor of each attribute feature is not less than the second reference value, determining that there is level-2 multicollinearity for each attribute feature.

9. The computer-implemented method of claim 8, wherein local feature data of each member device is modeling data of a regression model, and the method further comprises:

determining that there is the level-2 multicollinearity for each attribute feature; and in response, removing each attribute feature from modeling features of the regression model or combining each attribute feature and another related modeling feature of the regression model into a single modeling feature.

10. A non-transitory, computer-readable medium storing one or more instructions executable by a computer system to perform operations comprising:

performing, by one of at least two member devices, data alignment on respective local feature data with other one or more member devices of the at least two member devices, to construct a joint feature matrix, wherein each of the at least two member devices holds the respective local feature data;

performing, by the one of at least two member devices, privacy protection-based multi-party matrix multiplication computation with the other one or more member devices, to compute a product matrix of a transposed matrix of the joint feature matrix and the joint feature matrix, wherein each member device holds a submatrix of the product matrix;

determining, by the one of at least two member devices, an inverse matrix of the product matrix with the other one or more member devices based on respective submatrices of the product matrix, wherein each member device holds a submatrix of the inverse matrix;

determining, by the one of at least two member devices, a variance inflation factor of each attribute feature with the other one or more member devices using respective submatrices of the inverse matrix and the respective local feature data, wherein each member device holds fragment data of the variance inflation factor of each attribute feature; and determining, by the one of at least two member devices, multicollinearity with the other one or more member devices based on respectively held fragment data of the variance inflation factor of each attribute feature.

11. The non-transitory, computer-readable medium of claim 10, wherein determining the inverse matrix of the product matrix with the other one or more member devices based on the respective submatrices of the product matrix comprises:

determining the inverse matrix of the product matrix with the other one or more member devices using Newton's method and based on the respective submatrices of the product matrix, wherein in each Newton's iteration process, a matrix product of the respective submatrices of the product matrix of the member devices is implemented based on secret sharing matrix computation.

12. The non-transitory, computer-readable medium of claim 10, wherein local feature data of each member device comprises local feature data based on vertical data sharding or local feature data based on horizontal data sharding.

13. The non-transitory, computer-readable medium of claim 12, wherein the local feature data of each member device comprises local feature data based on vertical data sharding, and wherein determining the variance inflation factor of each attribute feature with the other one or more member devices using the respective submatrices of the inverse matrix and the respective local feature data comprises:
  determining, using the local feature data, a feature variance of each attribute feature that is held by the one of the at least two member devices; and
  determining the variance inflation factor of each attribute feature with the other one or more member devices based on the respective submatrices of the inverse matrix and respectively held feature variances of each attribute feature, wherein a product of the respective submatrices of the inverse matrix and respectively held feature variances of each attribute feature is obtained by performing secret sharing multiplication by the member devices using corresponding fragment elements in the respective submatrices of the inverse matrix and respectively held feature variances, and wherein the feature variances of each attribute feature that are held by the other one or more member devices are determined by each member device based on the respective local feature data.

14. The non-transitory, computer-readable medium of claim 12, wherein the local feature data of each member device comprises local feature data based on horizontal data sharding, and wherein determining the variance inflation factor of each attribute feature with the other one or more member devices using the respective submatrices of the inverse matrix and the respective local feature data comprises:
  determining, using the local feature data, a feature variance fragment of a feature variance of each attribute feature at the one of the at least two member devices; and
  determining the variance inflation factor of each attribute feature with the other one or more member devices based on the respective submatrices of the inverse matrix and the feature variance fragment of a feature variance of each attribute feature, wherein a product of the respective submatrices of the inverse matrix and the feature variance fragment of a feature variance of each attribute feature is obtained by performing secret sharing multiplication by the member devices using corresponding fragment elements in the respective submatrices of the inverse matrix and respective feature variance fragments, and wherein the feature variance fragments of the other one or more member devices are determined using respective local feature data.

15. The non-transitory, computer-readable medium of claim 10, wherein the privacy protection-based multi-party matrix multiplication computation comprises one of following multi-party matrix multiplications: multi-party block matrix multiplication or multi-party secret sharing transposed matrix multiplication.

16. The non-transitory, computer-readable medium of claim 10, wherein performing the data alignment on the respective local feature data with the other one or more member devices, to construct the joint feature matrix comprises:
  performing the data alignment on the respective local feature data with the other one or more member devices using a private set intersection protocol, to construct the joint feature matrix.

17. The non-transitory, computer-readable medium of claim 10, wherein determining, by the one of at least two member devices, multicollinearity with the other one or more member devices based on respectively held fragment data of the variance inflation factor of each attribute feature, comprises:
  reconstructing, as a reconstructed variance inflation factor of each attribute feature, the variance inflation factor of each attribute feature with the other one or more member devices based on respectively held fragment data of the variance inflation factor of each attribute feature;
  determining whether the reconstructed variance inflation factor of each attribute feature is less than a first reference value; and
  in response to determining that the reconstructed variance inflation factor of each attribute feature is less than the first reference value, determining that there is no multicollinearity for each attribute feature; or
  in response to determining that the reconstructed variance inflation factor of each attribute feature is not less than the first reference value:
    determining that the reconstructed variance inflation factor of each attribute feature is less than a second reference value; and
    in response to determining that the reconstructed variance inflation factor of each attribute feature is not less than the first reference value and less than the second reference value, determining that there is level-1 multicollinearity for each attribute feature; or
    in response to determining that the reconstructed variance inflation factor of each attribute feature is not less than the second reference value, determining that there is level-2 multicollinearity for each attribute feature.

18. The non-transitory, computer-readable medium of claim 17, wherein local feature data of each member device is modeling data of a regression model, and the operations further comprise:
  determining that there is the level-2 multicollinearity for each attribute feature; and
  in response, removing each attribute feature from modeling features of the regression model or combining each attribute feature and another related modeling feature of the regression model into a single modeling feature.

19. A computer-implemented system, comprising:
  at least two member devices; and
  one or more computer memory devices interoperably coupled with the at least two member devices and having tangible, non-transitory, machine-readable media storing one or more instructions that, when executed by the at least two member devices, perform one or more operations comprising:

performing, by one of the at least two member devices, data alignment on respective local feature data with other one or more member devices of the at least two member devices, to construct a joint feature matrix, wherein each of the at least two member devices holds the respective local feature data;

performing, by the one of the at least two member devices, privacy protection-based multi-party matrix multiplication computation with the other one or more member devices, to compute a product matrix of a transposed matrix of the joint feature matrix and the joint feature matrix, wherein each member device holds a submatrix of the product matrix;

determining, by the one of the at least two member devices, an inverse matrix of the product matrix with the other one or more member devices based on respective submatrices of the product matrix, wherein each member device holds a submatrix of the inverse matrix;

determining, by the one of the at least two member devices, a variance inflation factor of each attribute feature with the other one or more member devices using respective submatrices of the inverse matrix and the respective local feature data, wherein each member device holds fragment data of the variance inflation factor of each attribute feature; and determining, by the one of the at least two member devices, multicollinearity with the other one or more member devices based on respectively held fragment data of the variance inflation factor of each attribute feature.

20. The computer-implemented system of claim 19, wherein determining the inverse matrix of the product matrix with the other one or more member devices based on the respective submatrices of the product matrix comprises:

determining the inverse matrix of the product matrix with the other one or more member devices using Newton's method and based on the respective submatrices of the product matrix, wherein in each Newton's iteration process, a matrix product of the respective submatrices of the product matrix of the member devices is implemented based on secret sharing matrix computation.

* * * * *